US012800701B2

(12) United States Patent
Etter et al.

(10) Patent No.: US 12,800,701 B2
(45) Date of Patent: Nov. 17, 2026

(54) ACOUSTIC LOCALIZATION

(71) Applicant: Nokia Technologies Oy, Espoo (FI)

(72) Inventors: Walter Etter, Murray Hill, NJ (US); Gang Huang, Murray Hill, NJ (US)

(73) Assignee: NOKIA TECHNOLOGIES OY, Espoo (FI)

( * ) Notice: Subject to any disclaimer, the term of this patent is extended or adjusted under 35 U.S.C. 154(b) by 254 days.

(21) Appl. No.: 18/453,785

(22) Filed: Aug. 22, 2023

(65) Prior Publication Data

US 2025/0067836 A1 Feb. 27, 2025

(51) Int. Cl.
*G01S 5/24* (2006.01)

(52) U.S. Cl.
CPC .................................... *G01S 5/24* (2013.01)

(58) Field of Classification Search
CPC ............ G01S 5/24; G01S 3/8083; G01S 5/18; G01S 5/22; G01S 5/26; G01S 3/802; G01S 5/06
USPC .................................. 181/125; 367/21, 127
See application file for complete search history.

(56) References Cited

U.S. PATENT DOCUMENTS

| | | | | |
|---|---|---|---|---|
| 4,480,322 | A * | 10/1984 | Orieux | G01S 3/808 367/125 |
| 7,433,266 | B2 | 10/2008 | Ledeczi et al. | |
| 7,577,446 | B2 | 8/2009 | Guvenc et al. | |
| 7,729,204 | B2 * | 6/2010 | Peng | G01S 15/74 367/127 |
| 9,194,938 | B2 * | 11/2015 | Velusamy | G01S 3/86 |
| 9,209,909 | B2 * | 12/2015 | Booij | H04B 11/00 |
| 9,584,763 | B2 * | 2/2017 | Tangeland | H04N 7/147 |
| 9,674,661 | B2 * | 6/2017 | Chu | G01S 5/18 |
| 9,883,142 | B1 * | 1/2018 | Sun | G01S 5/28 |
| 9,883,342 | B2 * | 1/2018 | Sen | G01S 5/0273 |
| 10,670,694 | B1 * | 6/2020 | Youssef | G01S 3/8083 |
| 11,140,645 | B2 * | 10/2021 | Jean | H04L 67/12 |

(Continued)

FOREIGN PATENT DOCUMENTS

| | | |
|---|---|---|
| CN | 115914905 A | 4/2023 |
| GB | 2181239 A | 4/1987 |

OTHER PUBLICATIONS

"IEEE 802.11", Wikipedia, Retrieved on Jun. 2, 2023, Webpage available at : https://en.wikipedia.org/wiki/IEEE_802.11.

(Continued)

*Primary Examiner* — Dedei K Hammond
*Assistant Examiner* — Jennifer B Olson
(74) *Attorney, Agent, or Firm* — ALSTON & BIRD LLP

(57) ABSTRACT

Examples of the disclosure relate to localization that can be implemented with a low number of nodes. In examples of the disclosure an apparatus for acoustic localization comprises means for detecting two or more acoustic signals originating from two or more acoustic sources. The apparatus also comprises means for generating a first category of parameters for the two or more detected acoustic signals and generating a second category parameters for the two or more detected acoustic signals. At least, the first category of parameters and the second category of parameters are used to generate a timing parameter for the two or more detected acoustic signals. At least the timing parameter and the first category of parameters are used to determine an estimate of a location of an object associated with the two or more detected acoustic signals.

19 Claims, 19 Drawing Sheets

(56) References Cited

U.S. PATENT DOCUMENTS

| | | | | |
|---|---|---|---|---|
| 11,579,241 | B2 * | 2/2023 | McNames | G01S 5/18 |
| 12,262,173 | B2 * | 3/2025 | Zamora Esquivel | H04R 3/005 |
| 2012/0044786 | A1 | 2/2012 | Booij et al. | |
| 2013/0031046 | A1 * | 1/2013 | Huseth | G01S 5/0218 706/52 |
| 2019/0204430 | A1 | 7/2019 | Schmidt et al. | |
| 2022/0113370 | A1 | 4/2022 | Davis et al. | |
| 2023/0039932 | A1 * | 2/2023 | Booij | G01S 5/02585 |
| 2024/0323633 | A1 * | 9/2024 | van Mourik | H04R 1/08 |

OTHER PUBLICATIONS

Carotenuto et al., "Using ANT Communications for Node Synchronization and Timing in a Wireless Ultrasonic Ranging System", IEEE Sensors Letters, vol. 1, No. 6, Dec. 2017, 4 pages.

Rivard et al., "Ultrasonic Relative Positioning for Multi-Robot Systems", IEEE International Conference on Robotics and Automation, May 19-23, 2008, pp. 323-328.

Kato et al., "A Formation Method for Heterogeneous Multiple Robots by Specifying the Relative Position of Each Robot", Proceedings of SICE Annual Conference 2010, Aug. 18-21, 2010, pp. 3274-3277.

Zhang et al., "TDOA-Based Localization Using Interacting Multiple Model Estimator and Ultrasonic Transmitter/Receiver", IEEE Transactions on Instrumentation and Measurement, vol. 62, No. 8, Aug. 2013, pp. 2205-2214.

Kim et al., "Dynamic Ultrasonic Hybrid Localization System for Indoor Mobile Robots", IEEE Transactions on Industrial Electronics, vol. 60, No. 10, Oct. 2013, pp. 4562-4573.

"Marvelmind Indoor navigation system operating manual", Marvelmind Robotics, Mar. 28, 2023, pp. 1-283.

Gutierrez-Osuna et al., "Modeling of Ultrasonic Range Sensors for Localization of Autonomous Mobile Robots", IEEE Transactions on Industrial Electronics, vol. 45, No. 4, Aug. 1998, pp. 654-662.

Diamant et al., "Underwater localization with time-synchronization and propagation speed uncertainties", IEEE Transactions on Mobile Computing, vol. 12, No. 7, Jul. 2013, pp. 1257-1269.

Sequeira et al., "Robust covariance estimation for data fusion from multiple sensors", IEEE Transactions on Instrumentation and Measurement, vol. 60, No. 12, Dec. 2011, pp. 1-12.

Li et al., "Dilution of Precision in Positioning Systems Using Both Angle of Arrival and Time of Arrival Measurements", IEEE Access, vol. 8, Oct. 23, 2020, pp. 192506-192516.

Babu et al., "Sensor data fusion using Kalman filter", International Conference on Design Innovations for 3Cs Compute Communicate Control (ICDI3C), Apr. 25-28, 2018, pp. 29-36.

Wei et al., "Pair-Matching Method by Signal Covariance Matrices for 2D-DOA Estimation", IEEE Antennas and Wireless Propagation Letters, vol. 13, Jun. 17, 2014, pp. 1199-1202.

Nikunen et al., "Time-difference of arrival model for spherical microphone arrays and application to direction of arrival estimation", 25th European Signal Processing Conference (EUSIPCO), Aug. 28-Sep. 2, 2017, pp. 1255-1259.

Cao et al., "Self-Synchronizing Acoustic Positioning System Based on TDoA", CEUR Workshop Proceedings, Sep. 5-7, 2022, 7 pages.

Tan et al., "A low-cost centimeter-level acoustic localization system without time synchronization", Measurement, vol. 78, Jan. 2016, pp. 73-82.

Extended European Search Report for European Application No. 24191676.6 dated Feb. 5, 2025, 8 pages.

* cited by examiner

ACOUSTIC LOCALIZATION

TECHNOLOGICAL FIELD

Examples of the disclosure relate to acoustic localization. Examples of the disclosure relate to acoustic localization that can be implemented with a low number of nodes.

BACKGROUND

Localization can be used for many applications such as robotics or navigation of objections. Localization methods such as Time of Arrival (ToA) and Angle of Arrival (AoA) can be used in such applications.

BRIEF SUMMARY

According to various, but not necessarily all, examples of the disclosure there may be provided an apparatus for acoustic localization comprising means for:

detecting two or more acoustic signals originating from two or more acoustic sources;

generating a first category of parameters for the two or more detected acoustic signals;

generating a second category parameters for the two or more detected acoustic signals;

using, at least, the first category of parameters and the second category of parameters to generate a timing parameter for the two or more detected acoustic signals; and using, at least the timing parameter and the first category of parameters to determine an estimate of a location of an object associated with the two or more detected acoustic signals.

The first category of parameters may comprise two or more time of flight parameters.

The second category of parameters may comprise two or more angle of arrival parameters.

The means may be for using an iterative procedure to jointly resolve time of arrival equations and angle of arrival equations to generate the timing parameter.

The means may be for using, at least, the first category of parameters and the second category of parameters to generate an instantaneous timing parameter and using the instantaneous timing parameter to generate a predicted timing parameter.

The timing parameter may comprise a clock offset.

The means may be for using, at least, the first category of parameters and the second category of parameters to generate an orientation parameter for the object associated with the detected acoustic signals.

The means may be for using, at least, the orientation parameter and the estimate of the location of the object to estimate an orientation of the object.

The means may be for generating one or more additional estimates of the location of the object associated with the detected acoustic signals.

An additional estimate of the location of the object associated with the detected acoustic signals may be generated by using an orientation parameter and the second category of parameters.

An additional estimate of the location of the object associated with the detected acoustic signals may be generated by using first category of parameters and the second category of parameters.

The means may be for processing the estimate of the location of the object and one or more additional estimates of the location to generate an adjusted estimate of the location of the object.

The adjusted estimate of the location of the object may be generated by using one or more fusion estimation algorithms to combine parameters from two or more respective estimates of the location.

The object that is to be localized may comprise two or more microphones for detecting acoustic signals.

The object that is to be localized may comprise one or more loudspeakers for transmitting acoustic signals.

The object to be localized may be in the same environment as one or more acoustic sources and two or more microphones for detecting acoustic signals.

According to various, but not necessarily all, examples of the disclosure there may be provided a method comprising:

detecting two or more acoustic signals originating from two or more acoustic sources;

generating a first category of parameters for the two or more detected acoustic signals;

generating a second category parameters for the two or more detected acoustic signals;

using, at least, the first category of parameters and the second category of parameters to generate a timing parameter for the two or more detected acoustic signals; and using, at least the timing parameter and the first category of parameters to determine an estimate of a location of an object associated with the two or more detected acoustic signals.

According to various, but not necessarily all, examples of the disclosure there may be provided a computer program which when executed by an apparatus causes an apparatus to perform at least:

detecting two or more acoustic signals originating from two or more acoustic sources;

generating a first category of parameters for the two or more detected acoustic signals;

generating a second category parameters for the two or more detected acoustic signals;

using, at least, the first category of parameters and the second category of parameters to generate a timing parameter for the two or more detected acoustic signals; and using, at least the timing parameter and the first category of parameters to determine an estimate of a location of an object associated with the two or more detected acoustic signals.

According to various, but not necessarily all, examples of the disclosure there may be provided an apparatus for acoustic localization comprising means for:

detecting at least one acoustic signal originating from at least one acoustic source wherein the at least one acoustic signal is detected by multiple microphones;

generating a first category of parameters for the detected acoustic signal;

generating a second category parameters for the detected acoustic signal;

using, at least, the first category of parameters and the second category of parameters to generate a timing parameter for the detected acoustic signal; and using, at least the timing parameter and the first category of parameters to determine an estimate of a location of an object associated with the at least one detected acoustic signal.

The apparatus may be comprised within a reverse architecture system.

The two or more acoustic sources may be located on a mobile node and microphones for detecting the acoustic signals are located on one or more mobile nodes.

According to various, but not necessarily all, examples of the disclosure there may be provided an apparatus for acoustic localization comprising means for:

detecting three or more acoustic signals originating from three or more acoustic sources;

generating a first category of parameters for the three or more detected acoustic signals;

determining if one or more of the detected acoustic signals is an indirect path signal from a transmitter to a receiver;

estimating a location of an object associated with the detected acoustic signals using at least the first category of parameters and a timing parameter wherein an instantaneous timing parameter is used to estimate the location if it is not determined that one or more of the detected acoustic signals is an indirect path signal from a transmitter to a receiver and a predicted timing parameter is used to estimate the location if it is determined that one or more of the detected acoustic signals is an indirect path signal from a transmitter to a receiver.

The first category of parameters may comprise three or more time of flight parameters.

The instantaneous timing parameter may be estimated using the first category of parameters for the three or more detected acoustic signals.

The predicted timing parameter may be predicted based, at least in part, on previous estimates of the instantaneous timing parameter.

The timing parameter may comprise a clock offset.

The means may be for generating a second category of parameters for the three or more detected acoustic signals and estimating an orientation of the object associated with the detected acoustic signals using at least the second category of parameters and an orientation parameter wherein an instantaneous orientation parameter is used if it is not determined that one or more of the detected acoustic signals is an indirect path signal from a transmitter to a receiver and a predicted orientation parameter is used if it is determined that one or more of the detected acoustic signals is an indirect path signal from a transmitter to a receiver.

The second category of parameters may comprise three or more angle of arrival parameters.

The instantaneous orientation parameter may be estimated using second category of parameters for the three or more detected acoustic signals.

The predicted orientation parameter may be predicted based, at least in part, on previous estimates of the instantaneous orientation parameter.

The means may be for generating one or more additional estimates of the location of the object associated with the detected acoustic signals.

An additional estimate of the location of the object associated with the detected acoustic signals may be generated by using the second category of parameters.

The means may be for processing the estimate of the location of the object and one or more additional estimates of the location to generate an adjusted estimate of the location of the object.

The adjusted estimate of the location of the object may be generated by using one or more fusion estimation algorithms to combine parameters from two or more respective estimates of the location.

The object that is to be localized may comprise two or more microphones for detecting acoustic signals.

The object that is to be localized may comprise one or more loudspeakers for transmitting acoustic signals.

The object to be localized may be in the same environment as one or more loudspeakers for transmitting acoustic signals and two or more microphones for detecting acoustic signals.

According to various, but not necessarily all, examples of the disclosure there may be provided a method comprising:

detecting three or more acoustic signals originating from three or more acoustic sources;

generating a first category of parameters for the three or more detected acoustic signals;

determining if one or more of the detected acoustic signals is an indirect path signal from a transmitter to a receiver;

estimating a location of an object associated with the detected acoustic signals using at least the first category of parameters and a timing parameter wherein an instantaneous timing parameter is used to estimate the location if it is not determined that one or more of the detected acoustic signals is an indirect path signal from a transmitter to a receiver and a predicted timing parameter is used to estimate the location if it is determined that one or more of the detected acoustic signals is an indirect path signal from a transmitter to a receiver.

According to various, but not necessarily all, examples of the disclosure there may be provided a computer program which when executed by an apparatus causes an apparatus to perform at least:

detecting three or more acoustic signals originating from three or more acoustic sources;

generating a first category of parameters for the three or more detected acoustic signals;

determining if one or more of the detected acoustic signals is an indirect path signal from a transmitter to a receiver;

estimating a location of an object associated with the detected acoustic signals using at least the first category of parameters and a timing parameter wherein an instantaneous timing parameter is used to estimate the location if it is not determined that one or more of the detected acoustic signals is an indirect path signal from a transmitter to a receiver and a predicted timing parameter is used to estimate the location if it is determined that one or more of the detected acoustic signals is an indirect path signal from a transmitter to a receiver.

According to various, but not necessarily all, examples of the disclosure there may be provided an apparatus for acoustic localization comprising means for:

detecting at least one acoustic signal originating from at least one acoustic source wherein the acoustic signals are detected by multiple microphones to generate at least multiple microphone signals;

generating a first category of parameters for the three or more microphone signals;

determining if one or more of the microphone signals acoustic signals corresponds to an indirect path signal from a transmitter to a receiver;

estimating a location of an object associated with the detected acoustic signal using at least the first category of parameters and a timing parameter wherein an instantaneous timing parameter is used to estimate the location if it is not determined that one or more of the microphone signals correspond to an indirect path signal from a transmitter to a receiver and a predicted timing parameter is used to estimate the location if it is determined that one or more of the microphone signals corresponds to an indirect path signal from a transmitter to a receiver.

The apparatus may be comprised within a reverse architecture system.

The at least one acoustic source may be located on a mobile node and the multiple microphones may be located on one or more mobile nodes.

While the above examples of the disclosure and optional features are described separately, it is to be understood that their provision in all possible combinations and permutations is contained within the disclosure. It is to be understood that various examples of the disclosure can comprise any or all of the features described in respect of other examples of the disclosure, and vice versa. Also, it is to be appreciated that any one or more or all of the features, in any combination, may be implemented by/comprised in/performable by an apparatus, a method, and/or computer program instructions as desired, and as appropriate.

BRIEF DESCRIPTION

Some examples will now be described with reference to the accompanying drawings in which.

Figure 1:
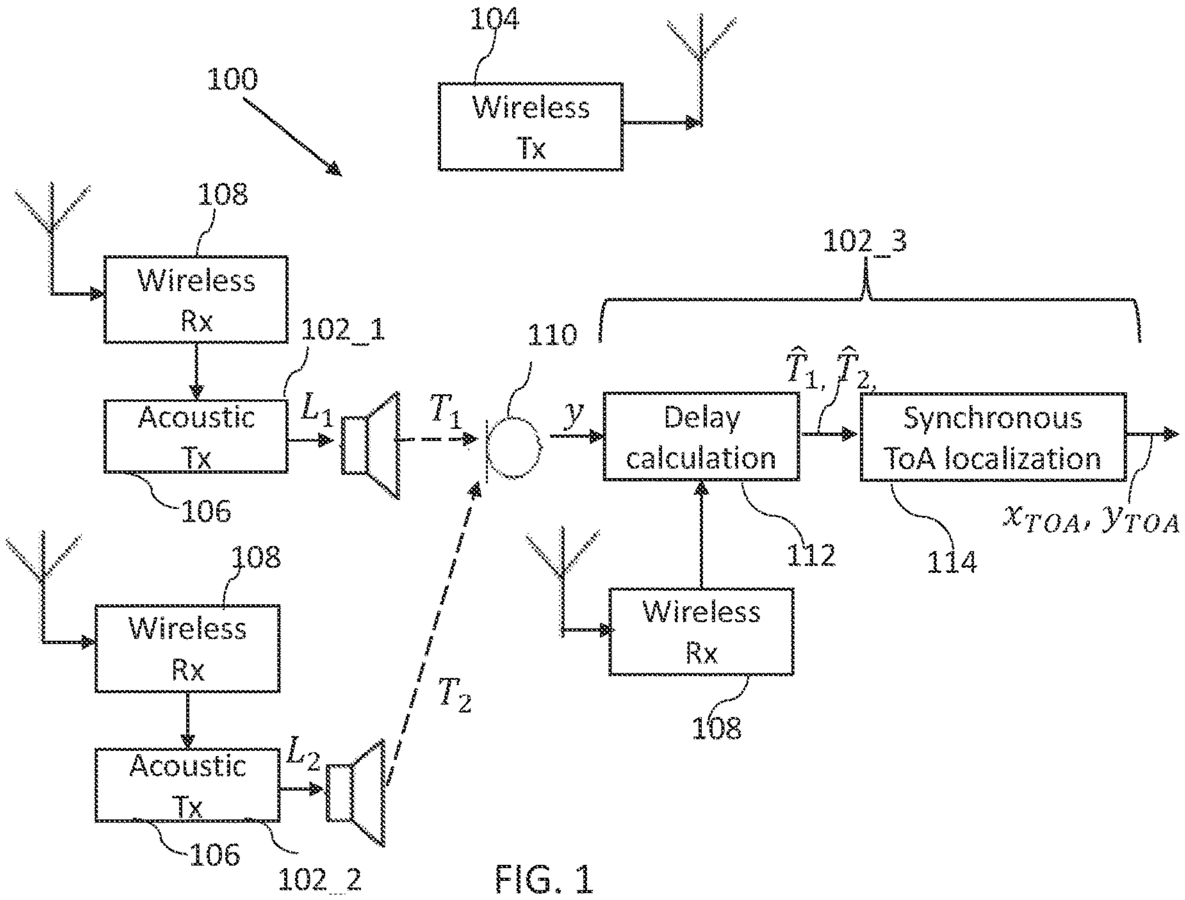
FIG. 1 shows an example acoustic localization system.

The figures are not necessarily to scale. Certain features and views of the figures can be shown schematically or exaggerated in scale in the interest of clarity and conciseness. For example, the dimensions of some elements in the figures can be exaggerated relative to other elements to aid explication. Corresponding reference numerals are used in the figures to designate corresponding features. For clarity, all reference numerals are not necessarily displayed in all figures.

DETAILED DESCRIPTION

FIG. 1 shows an example acoustic localization system 100 in which synchronization between acoustic localization signals is achieved by using wireless transmitters and receivers.

The example system of FIG. 1 comprises multiple localization nodes 102 and a wireless transmitter 104. In this example three localization nodes 102 are shown. Other numbers of localization nodes 102 could be used in other examples.

The wireless transmitter 104 is configured to transmit a clock or timing signal. The clock or timing signals can be received by wireless receivers 108 of the localization nodes 102.

In the example of FIG. 1 two of the localization nodes 102_1, 102_2 are transmitting nodes. The respective transmitting localization nodes 102_1,102_2 comprise an acoustic transmitter 106 and a wireless receiver 108.

The wireless receivers 108 are configured to receive wireless signals that are transmitted by the wireless transmitter 104. The wireless signals can comprise clock or timing signals.

The acoustic transmitter 106 is configured to transmit an acoustic signal $L_1$, $L_2$ that can be used for localization. The acoustic signals $L_1$, $L_2$ can comprise unique signal sequences. The signal sequences can be unique to a specific localization nodes 102 so that different localization nodes 102 use different signal sequences. The signal sequences can comprise a chirp/sweep signal, or a pseudo-random noise sequence or any other suitable type of signal. The start of the signal sequences can be triggered at specific time instances. The time instances can be derived from the clock or timing signals from the wireless transmitter 104. In some examples a timestamp based on the clock or timing signals can be used to trigger the acoustic signals.

The third localization node 102_3 is a receiving node. The receiving localization node 102_3 comprises a microphone 110, a wireless receiver 108, a delay calculation module 112, and a localization module 114.

The wireless receiver 108 is configured to receive wireless signals that are transmitted by the wireless transmitter 104. These would be the same clock or timing signals that are received by the wireless receivers 108 of the receiving localization nodes 102_1, 102_3.

The microphone 110 is configured to detect acoustic signals from the acoustic transmitters 106. The acoustic signals have time of flight $T_1$, $T_2$ from the respective acoustic transmitters 106 to the microphone 110. The microphone 110 is configured to convert the detected acoustic signals into a microphone signal y. The microphone signal y is provided as an input to the delay calculation module 112.

The delay calculation module 112 is configured to receive the microphone signal y from the microphone 110 and the timing information from the wireless receiver 108. The delay calculation module 112 is configured to calculate the delay between the transmit time of the acoustic signals at the transmitting localization nodes 102_1, 102_2 and the receive time of the acoustic signals that are detected by the microphone 110. The delay calculation module 112 provides estimated times of flight $\hat{T}_1$, $\hat{T}_2$ as an output. The estimated times of flight $\hat{T}_1$, $\hat{T}_2$ can be determined based on the time of arrival of the detected acoustic signals and the timing information from the clock or timing signals.

The localization module 114 is configured to determine a location of the receiving localization node. The localization module 114 is configured to receive the estimated times of flight $\hat{T}_1$, $\hat{T}_2$ as an input. The distances $d_1$ and $d_2$ between the transmitting localization nodes 102_1, 102_2 and the receiving localization node 102_3 can be determined by multiplying the estimated times of flight $\hat{T}_1$, $\hat{T}_2$ with the speed of sound c. The respective distance can then be used to determine the coordinates $x_{TOA}$, $y_{TOA}$ of the receiving localization node 102_3.

The loudspeaker can be connected to the acoustic transmitter 106 via any suitable means. In some examples the loudspeaker and the acoustic transmitter 106 can be collocated. Different arrangements could be used in other examples. For instance, the acoustic transmitter 106 and the loudspeakers could be connected via cables so that the loudspeaker could be in a different location to the acoustic transmitter 106. The position of the loudspeaker is the position that is used for localization purposes. Similarly, the microphone 110 and the receiving localization node 102_3 could be connected via cables so that the microphone 110 could be in a different location to the receiving localization node 102_3. The position of the microphone 110 is the position that is used for localization purposes.

Figure 2:
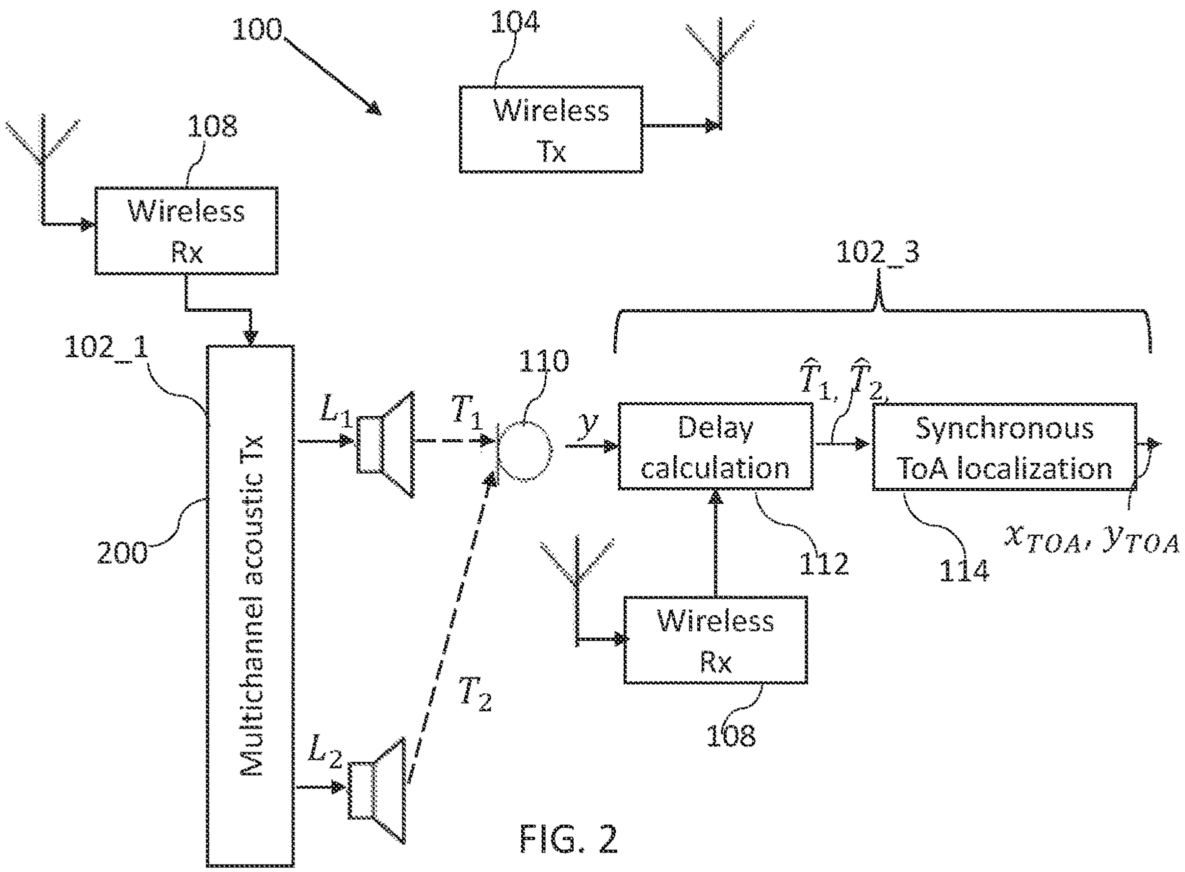
FIG. 2 shows an example acoustic localization system.

FIG. 2 shows another example acoustic localization system 100 in which synchronization between acoustic localization signals is achieved by using wireless transmitters and receivers.

The example acoustic localization system 100 of FIG. 2 is similar to the acoustic localization system 100 of FIG. 1 except that instead of having two separate transmitting localization nodes 102_1,102_2 to transmit two acoustic signals $L_1$, $L_2$ a single transmitting localization node 102_1 is configured to transmit two acoustic signals $L_1$, $L_2$.

In this example the transmitting localization node 102_1 comprises a multi-channel acoustic transmitter 200. In this case the transmitting localization node 102_1 is a multi-channel node. The multi-channel acoustic transmitter 200 is configured to transmit multiple acoustic signals $L_1$, $L_2$ that can be used for localization. Each of the acoustic signals $L_1$, $L_2$ that is transmitted by the multi-channel acoustic transmitter 200 has a unique signal sequence.

In this case the transmitted acoustic signals $L_1$, $L_2$ are synchronized among each other, however they are not synchronized with the receiving localization node 102_3. Therefore, the clock or timing signals from the wireless transmitter 104 are still needed to synchronize the signals.

In the example systems of FIGS. 1 and 2 each of the localization nodes 102 requires a wireless receiver 108 to receive a clock or timing signal from the wireless transmitter 104. If the wireless signalling is not used or fails localization cannot be achieved due to a lack of sufficient information to solve all unknowns in the necessary equations.

Examples of the disclosure provide acoustic localization systems 100 that do not require a wireless transmitter and wireless receivers. In examples of the disclosure the acoustic signals alone can be used to determine the position and orientation of a mobile node. The examples of the disclosure simplify the hardware, shorten the setup time, reduce the number of critical elements that could fail, and lower the system's cost. Furthermore, examples of the disclosure can reduce power consumption and thereby increase battery life for mobile nodes.

Figure 3:
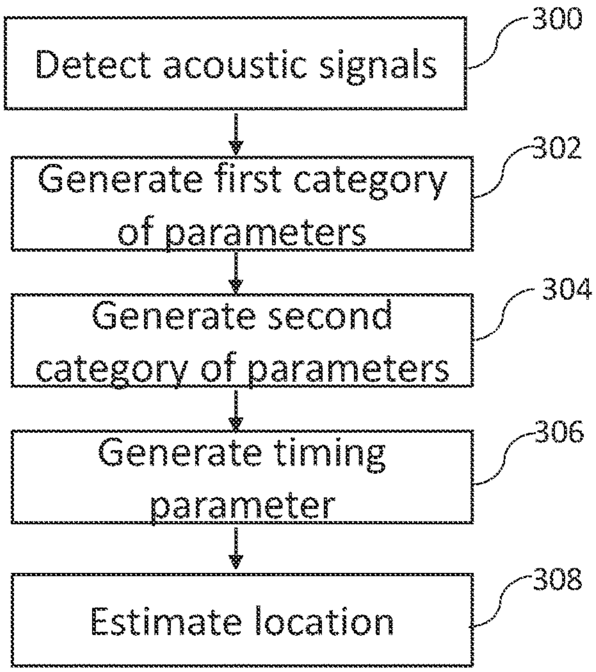
FIG. 3 shows an example method.

FIG. 3 shows an example method that can be used to localize an object in some examples of the disclosure.

The object that is to be localized can be a receiving localization node 102 or a transmitting localization node 102. Whether the object that is to be positioned is a receiving localization node 102 or a transmitting localization node 102 depends on the architecture of the system 100. That is, it will depend on whether a forward architecture or a reverse architecture is used for the system 100.

In some examples the object that is to be localized can comprise two or more microphones 110 for detecting acoustic signals. This type of arrangement can be used in systems 100 with a forward architecture. In some examples the object that is to be localized comprises one or more loudspeakers for transmitting acoustic signals. This type of arrangement can be used in systems 100 with a reverse architecture.

The method comprises, at block 300, detecting two or more acoustic signals originating from two or more acoustic sources. The acoustic source can be a sound emitting transducer such as a loudspeaker. The acoustic sources can be part of transmitting localization nodes 102 or any other suitable entities.

The object to be localized can be in the same environment as one or more acoustic sources and two or more microphones for detecting acoustic signals. The acoustic sources and the microphones 110 can be part of localization nodes 102.

The acoustic signals can be in the audible range and/or in the ultrasonic range.

The acoustic signals can comprise unique signal sequences. The signal sequences can comprise a chirp/sweep signal, or a pseudo-random noise sequence or any other suitable type of signal.

The detection of the acoustic signals can comprise the identifying of the signal sequence in the acoustic signals. The process of the detection can comprise the acquisition of the acoustic signal by one or more microphones 110 and the conversion of the acoustic signal into an electric signal. The process of the detection can also comprise converting an analog electric signal to a digital signal. The process of the detection can also comprise identifying the signal sequence by correlating the acquired acoustic signal with the transmitted signal (as it is performed by a matched filter) and applying a threshold. Likewise, the process of detection can also comprise identifying the signal sequence by convolving the acquired acoustic signal with the time-reversed version of the transmitted signal and applying a threshold.

At block 302 the method comprises generating a first category of parameters for the two or more detected acoustic signals and at block 304 the method comprises generating a second category parameters for the two or more detected acoustic signals. The second category can be different to the first category. For example, the first category of parameters can relate to a first physical property of the detected acoustic signals and the second category of parameters can relate to a second physical property of the detected acoustic signals.

In some examples the first category of parameters can comprise two or more time of flight parameters. The time of flight parameters can comprise an indication of the time of flight of the acoustic signals between a transmitter and a receiver. The time of flight parameters can be adjusted or biased.

In some examples the second category of parameters can comprise two or more angle of arrival parameters. The angle of arrival parameters can comprise an indication of the angle at which the acoustic signals arrive at the transmitter. The angle of arrival parameters can be adjusted or biased.

At block 306 the method comprises using, at least, the first category of parameters and the second category of parameters to generate a timing parameter for the two or more detected acoustic signals.

The timing parameter can be a parameter indicative of the relative timings that the acoustic signals arrive at the receiving localization node 102. The timing parameter could be an indication of a relative delay between the respective acoustic signals or could be indications of the respective times at which they arrived. In some examples the timing parameter comprise a clock offset.

Any suitable procedure can be used to generate the timing parameter. In some examples the procedure can comprise jointly resolving time of arrival equations and angle of arrival equations to generate the timing parameter. In some examples the procedure can comprise using, at least, the first category of parameters and the second category of parameters to generate an instantaneous timing parameter and using the instantaneous timing parameter to generate a predicted timing parameter. The predicted timing parameter could be predicted for a time that occurs after the occurrence of the time for which the instantaneous timing parameter has been generated.

At block 308 the method comprises using, at least the timing parameter and the first category of parameters to determine an estimate of a location of an object associated with the two or more detected acoustic signals. The estimate of the location of an object can be an improved or updated estimate. The estimate can be used as an output that is indicative of the location of the object.

The object that is to be located can be associated with the acoustic signals in that it can be an object that transmits or receives acoustic signals or an object that is connected to a transmitter or object that receives or transmits acoustic signals. For example, the object could be a person that is wearing a device that can transmit or receive the acoustic signals.

In the example of FIG. 3 two or more acoustic signals from two or more acoustic sources are detected. There might be use cases where more than two signals are useful. For example, three or more signals can be useful if it is needed to localize an object in three dimensions. This could be the case if the object is a drone or other similar object.

In some examples the method can comprise one or more blocks that are not shown in FIG. 3. For instance, in some examples the method can comprise generating additional parameters. In some examples the method can comprise using, at least, the first category of parameters and the second category of parameters to generate an orientation parameter for the object associated with the detected acoustic signals. The orientation parameter and the estimate of the location of the object can be used to estimate an orientation of the object.

In some examples the method can comprise generating one or more additional estimates of the location of the object associated with the detected acoustic signals. The estimate of the location and the one or more additional estimates of the location can be processed to generate an adjusted estimate of the location of the object. This can result in a more accurate or reliable estimate of the location. In some examples the adjusted estimate of the location of the object can comprise more information than the original estimate. For example, it can comprise information relating to the orientation of the object as well as the coordinate location.

The additional estimates can be generated using different procedures to the estimate generated using the method of FIG. 3. As an example, an additional estimate of the location of the object associated with the detected acoustic signals can be generated by using an orientation parameter and the second category of parameters. In some examples an additional estimate of the location of the object associated with the detected acoustic signals can be generated by using first category of parameters and the second category of parameters.

The adjusted estimate of the location of the object can generated by using any suitable means or procedures. In some examples the adjusted estimate of the location can be generated by using one or more fusion estimation algorithms to combine parameters from two or more respective estimates of the location. The fusion estimation algorithms can comprise covariance intersection, Geometric Dilution of Precision (GDOP), extended Kalman filtering or any other suitable algorithms.

Figure 4:
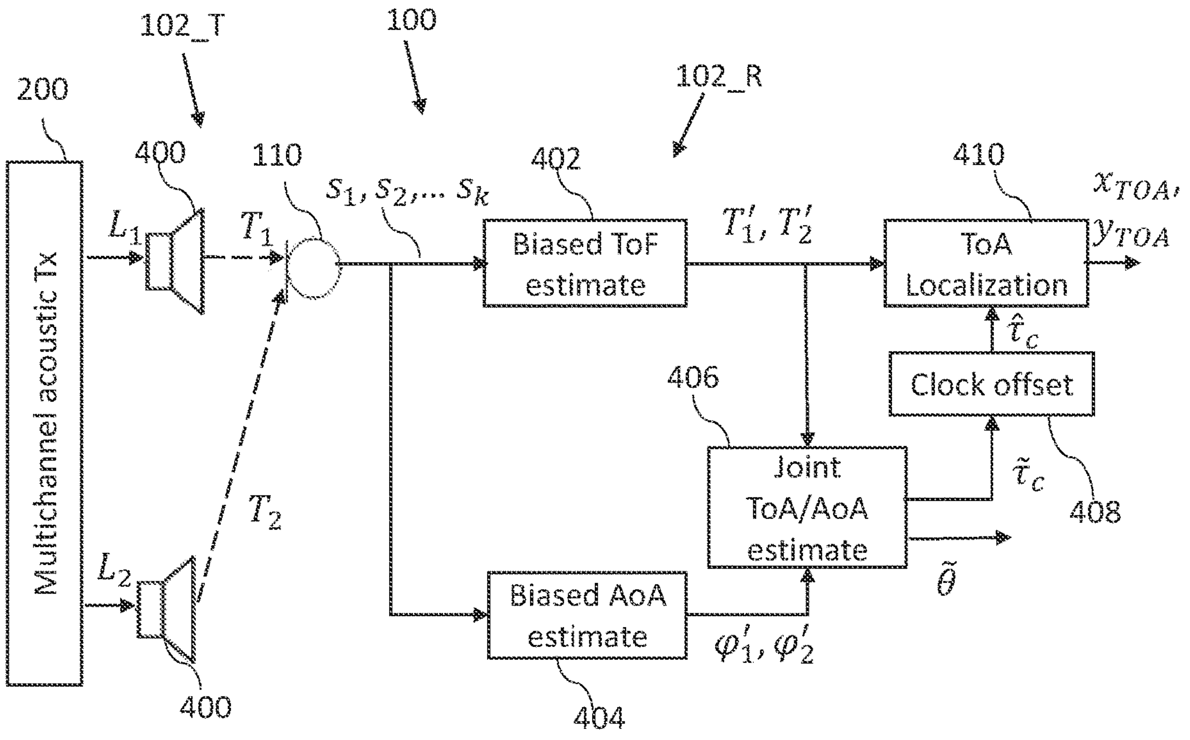
FIG. 4 shows an example acoustic localization system.

FIG. 4 schematically shows an example acoustic localization system 100 that could be used to implement examples of the disclosure. The example acoustic localization system 100 could be used to implement the example methods of FIG. 3 or any other suitable methods. The example system 100 of FIG. 4 can be used to enable localization of an object without using wireless synchronization. The system 100 of FIG. 4 does not need to use wireless transmitters or receivers to localize an object.

In this example the system 100 comprise a transmitting localization node 102_T and a receiving localization node 102_R. In this example the transmitting localization node 102_T is a multichannel node. The multichannel node comprises multiple acoustic sources 400.

In the example of FIG. 4 the transmitting localization node 102_T is configured to transmit two acoustic signals $L_1$, $L_2$. The transmitting localization node 102_T comprises a multi-channel acoustic transmitter 200 and multiple loudspeakers. The loudspeakers provide acoustic sources 400. In the example of FIG. 4 the transmitting localization node 102_T comprises two acoustic sources 400. In other examples the transmitting localization node 102_T can comprise more than two acoustic sources 400 and/or there can be more than one transmitting localization node 102_T.

The transmitting localization node 102_T provides the acoustic signals $L_1$, $L_2$ that can be used to localize an object. In examples of the disclosure at least two acoustic signals $L_1$, $L_2$ are provided. In the example of FIG. 4 a single transmitting localization node 102_T provides two acoustic signals $L_1$, $L_2$. In other examples a single transmitting localization node 102_T could provide more than two acoustic signals $L_1$, $L_2$ and/or the system 100 can comprise more than one transmitting localization node 102_T.

The acoustic signals $L_1$, $L_2$ can be in the audible range and/or the ultrasonic range. The acoustic signals $L_1$, $L_2$ can comprise signal sequences that enable the acoustic signals $L_1$, $L_2$ to be distinguished from each other.

In this example the receiving localization node 102_R comprises a microphone array 110, a biased Time of Flight (ToF) estimate module 402, a biased Angle of Arrival (AoA) estimate module 404, a joint Time of Arrival/Angle of Arrival (ToA/AoA) estimate module 406, a clock offset prediction module 408 and a ToA localization module 410. The receiving localization node 102_R can comprise other components in other examples.

The microphone array 110 comprises K microphone elements. The microphone array 110 can have any suitable geometry. For example, the microphone array 110 could be linear, circular, or spherical or any other suitable shape. The microphone array 110 can have any suitable dimensions. The dimensions that are used for the microphone array 110 can depend on the frequency range of the acoustic signals $L_1$, $L_2$. As an example, for ultrasonic localization in the frequency range of 20 kHz to 30 kHz, a circular microphone array 110 with a diameter of 1 cm may be suitable. Furthermore, for many applications an array with K=6 microphone elements may be adequate. Other configurations for the microphone array 110 could be used in other examples.

The microphone array 110 detects the acoustic signals $L_1$, $L_2$ that have been transmitted from the acoustic sources 400. The microphone array 110 provides the microphone signals $s_1(i)$, $s_2(i)$, . . . , $s_K(i)$, of the K microphone elements in the array as an output.

The receiving localization node 102_R is configured so that the microphone signals $s_1(i)$, $s_2(i)$, . . . , $s_K(i)$, are provided to the biased ToF estimate module 402 and the biased AoA estimate module 404.

In the example of FIG. 4 only a single microphone signal $s_1(i)$ is used by the biased ToF estimate module 402. However, all of the microphone signals $s_1(i)$, $s_2(i)$, . . . , $s_K(i)$ are used by the biased AoA estimate module 404.

The biased ToF estimate module 402 is configured to generate a first category of parameters for the detected acoustic signals $L_1$, $L_2$. In this example the first category of parameters are biased time of flight estimates.

The biased ToF is estimated from a single microphone signal, e.g., $s_1(i)$. To estimate the biased ToF the start of the transmitted signal sequence is detected. To improve the detection of this sequence, a matched filter can be applied to the received signal. that is, the cross correlation between the received signal and the reversed transmitted signal is computed.

The biased ToF estimation module 402 is configured to calculate the ToF for the respective acoustic signals $L_1$, $L_2$. The ToF is calculated with a common bias for each of the acoustic signals $L_1$, $L_2$. The common bias is the unknown clock offset.

The biased ToF estimation module 402 provides biased time of flight estimates $$T_1', T_2'$$

as an output.

The biased AoA estimate module 404 is configured to generate a second category of parameters for the detected acoustic signals $L_1$, $L_2$. In this example the second category of parameters are biased angle of arrival estimates.

The biased AoA is estimated from multiple microphone signals $s_1(i)$, $s_2(i)$, . . . , $s_K(i)$. Any suitable process can be used to estimate the angle of arrival from the microphone signals $s_1(i)$, $s_2(i)$, . . . , $s_K(i)$. The AoAs are calculated with a common bias for each of the acoustic signals $L_1$, $L_2$. The bias of these angles is the unknown orientation $\theta(i)$ of the object that is to be positioned. The unbiased angle of arrivals are $\varphi_1(i)-\theta(i)$ and $\varphi_2(i)-\theta(i)$. For brevity, time indices i are dropped in FIG. 4, but all parameters in FIG. 4 would be updated periodically based on a pre-configured microphone-signal frame duration (such as, 100 ms).

The biased AoA estimation module 404 provides biased angle of arrival estimates $\varphi_1'$, $\varphi_2'$ as an output.

The biased time of flight estimates $$T_1', T_2'$$

and the biased angle of arrival estimates $$\varphi_1', \varphi_2'$$

are provided as inputs to the joint Toa/AoA estimate module 406. The biased time of flight estimates $$T_1', T_2'$$

and the biased angle of arrival estimates $$\varphi_1', \varphi_2'$$

provide a first category of parameters and a second category of parameters that can be used to generate a timing parameter. The joint Toa/AoA estimate module 406 can be configured to use the biased time of flight estimates $$T_1', T_2'$$

and the biased angle of arrival estimates $$\varphi_1', \varphi_2'$$

to generate the timing parameter.

In the example of FIG. 4 the timing parameter is an instantaneous clock offset $\tilde{\tau}_c$. Other types of timing parameter can be estimated in other examples.

The joint Toa/AoA estimate module 406 can be configured to use any suitable process to generate the timing parameter. In some examples the timing parameter can be generated using iterative solutions such as the Newton-Raphson method.

The joint Toa/AoA estimate module 406 provides the timing parameter as an output. The joint Toa/AoA estimate module 406 can also be configured to generate other output parameters such as an estimate of the instantaneous orientation $\tilde{\theta}$ of the object to be localized.

Figure 11:
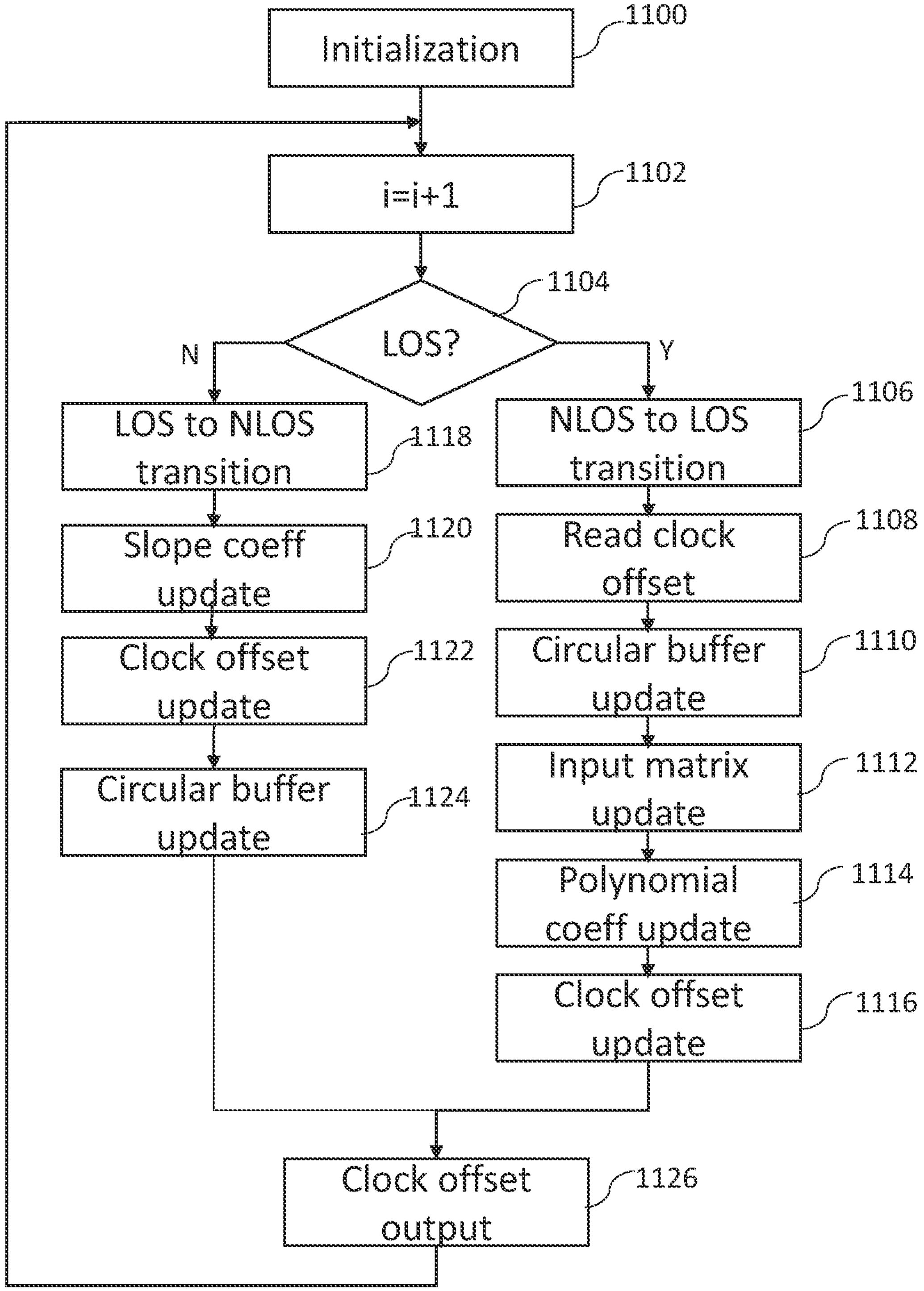
FIG. 11 shows an example method.
Figure 12:
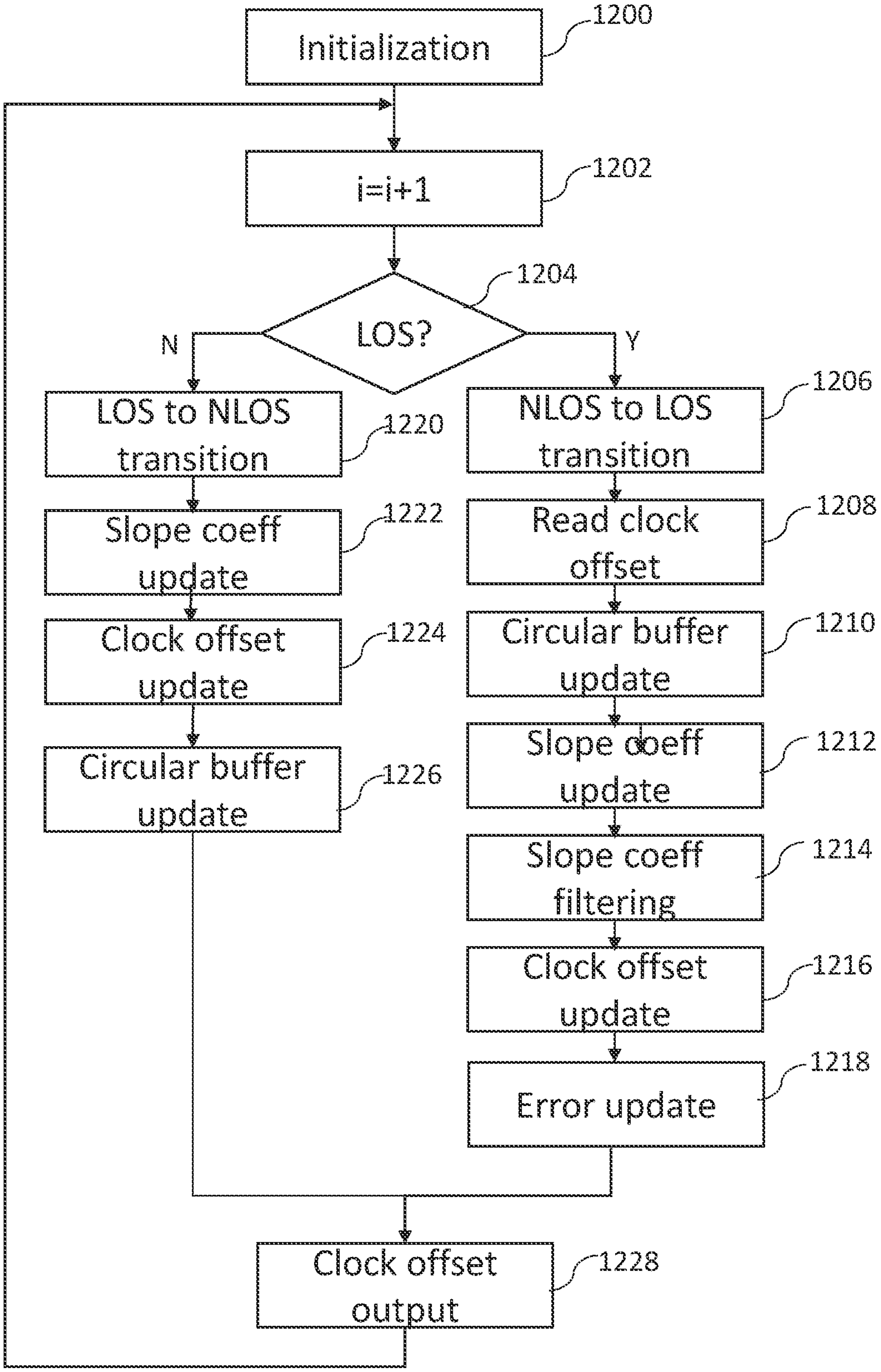
FIG. 12 shows an example method.
Figure 13:
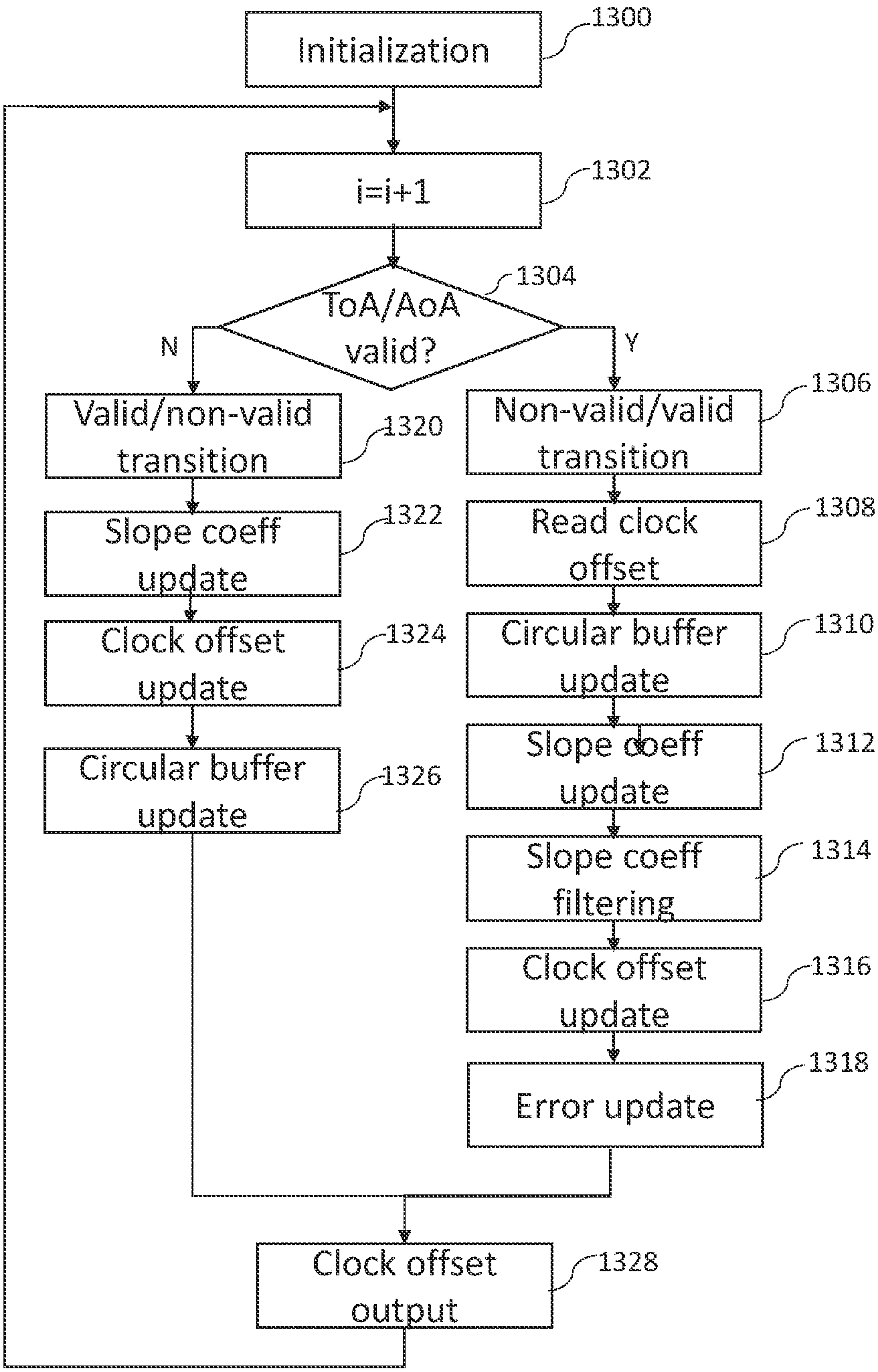
FIG. 13 shows an example method.

In some examples the timing parameter can be provided as an input to the synchronous ToA Localization module 410. In the example of FIG. 4 the timing parameter is provided as an input to a clock offset prediction module 408. The clock offset prediction module 408 is configured to generate an improved clock offset estimate $\hat{\tau}_c$. FIGS. 11 to 13 show examples of a clock offset prediction module 408. Other configurations of the clock offset prediction block 408 could be used.

The timing parameter or the improved timing parameter are provided as an input to the synchronous ToA Localization module 410. The synchronous ToA Localization module 410 is also configured to receive the biased time of flight estimates $$T_1', T_2'$$

as an input.

The synchronous ToA Localization module 410 is configured to use, at least the timing parameter and the first category of parameters to determine an estimate of a location of either the receiving localization node 102_R or the transmitting localization node 102_T. In this case the first category of parameters comprise the biased time of flight estimates $$T_1', T_2'.$$

The synchronous ToA Localization module 410 is configured to provide the estimate of the location, $x_{ToA}$, $y_{ToA}$ as an output.

Figure 5:
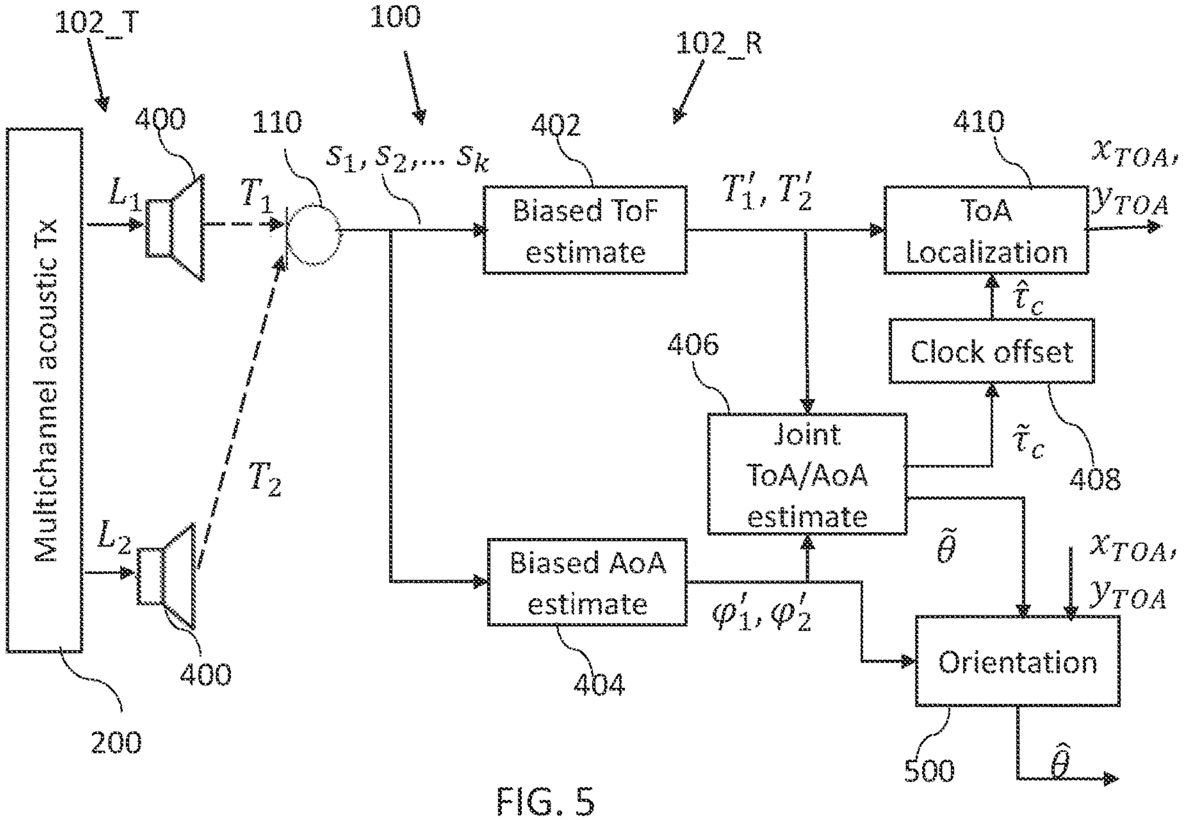
FIG. 5 shows an example acoustic localization system.

FIG. 5 schematically shows another example acoustic localization system 100 that could be used to implement examples of the disclosure. The example acoustic localization system 100 shown in FIG. 5 is similar to the system 100 shown in FIG. 4. In the example of FIG. 5 the transmitting localization node 102_T is a multichannel node. The multichannel node comprises multiple acoustic sources 400. In the system 100 of FIG. 5 the receiving localization node 102-R comprises an orientation module 500.

Figure 14:
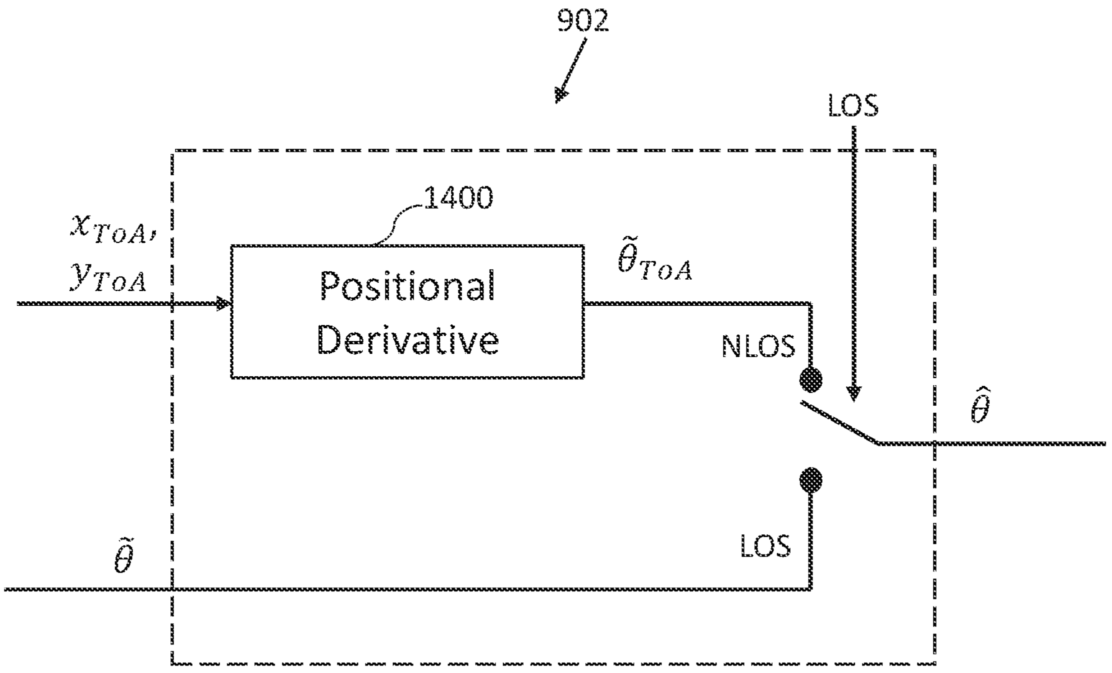
FIG. 14 shows an example orientation prediction block.

The orientation module 500 is configured to generate an improved orientation estimate $\hat{\theta}$. The orientation module 500 can provide means for using, at least, the first category of parameters and the second category of parameters to generate an orientation parameter. FIG. 14 shows an example of an orientation module 500. Other configurations of the orientation module 500 could be used.

The orientation module 500 is configured to receive the biased angle of arrival estimates $$\varphi_1', \varphi_2',$$

the estimate of the instantaneous orientation $\tilde{\theta}$ and the estimate of the location, $x_{ToA}$, $y_{ToA}$ as an input. The orientation module 500 is configured to process these inputs to calculate the improved orientation estimate $\hat{\theta}$. The improved orientation estimate $\hat{\theta}$ can be calculated by using the derivative of the location (that is, a velocity vector) derived from consecutive estimates of the location, $x_{ToA}$, $y_{ToA}$.

Figure 6:
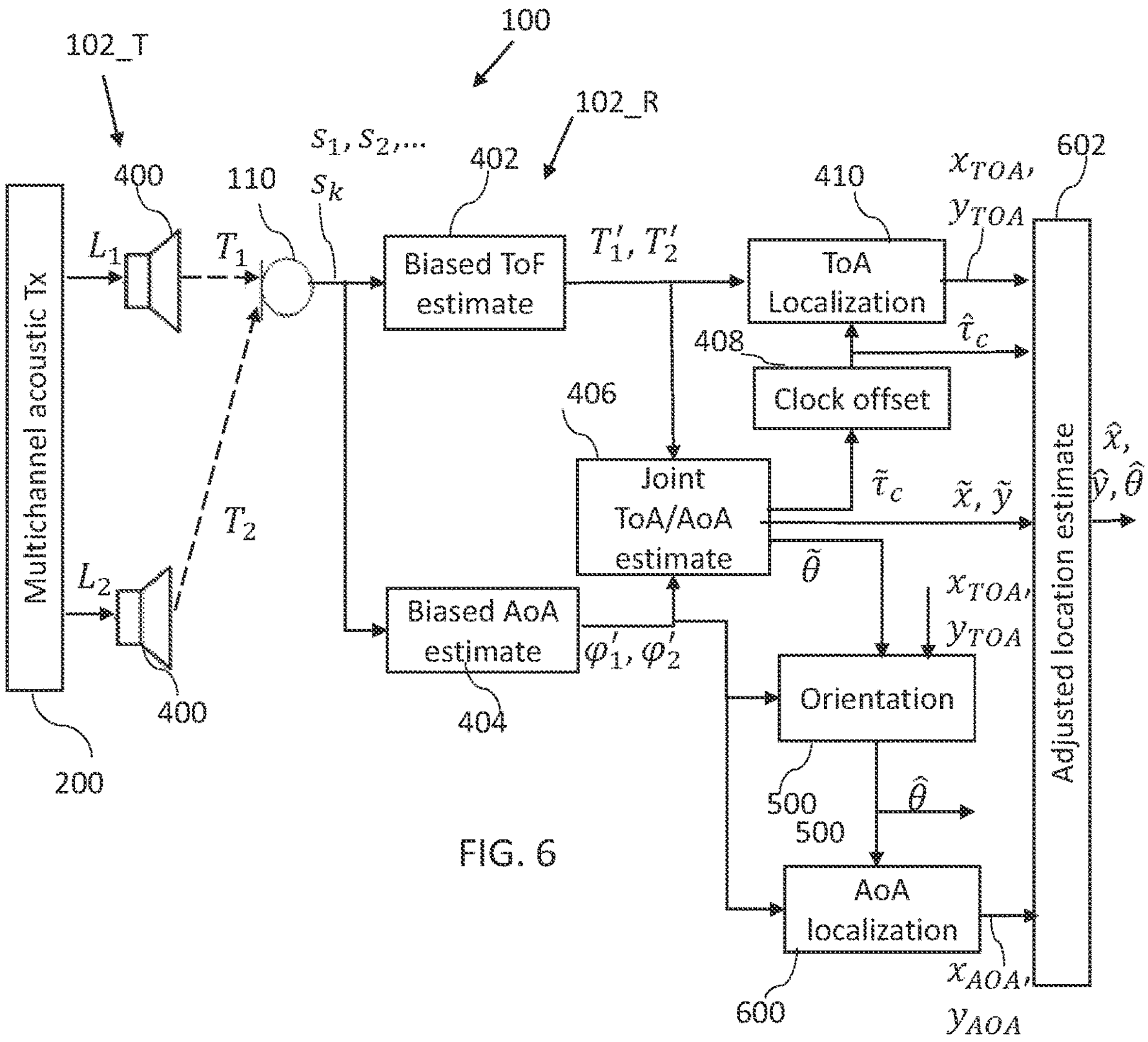
FIG. 6 shows an example acoustic localization system.

FIG. 6 schematically shows another example acoustic localization system 100 that could be used to implement examples of the disclosure. The example acoustic localization system 100 shown in FIG. 6 is similar to the system 100 shown in FIG. 5. In the example of FIG. 6 the transmitting localization node 102_T is a multichannel node. The multichannel node comprises multiple acoustic sources 400. In the system 100 of FIG. 6 the receiving localization node 102_R comprises an AoA localization module 600 and an adjusted location estimator module 602.

The AoA localization module 600 is configured to use, at least an orientation parameter and the second category of parameters to determine another estimate of a location of either the receiving localization node 102_R or the transmitting localization node 102_T. The AoA localization module 600 can be configured to perform an analogous function to the ToA localization module 410.

The AoA localization module 600 is configured to receive the second category of parameters and an orientation parameter as an input. In this example the second category of parameters comprise the biased angle of arrival estimates $$\varphi_1', \varphi_2',$$

and the orientation parameter comprises the improved orientation estimate $\hat{\theta}$. The synchronous AoA localization module 600 is configured to provide another estimate of the location, $x_{AoA}$, $y_{AoA}$ as an output. The estimate of the location, $x_{AoA}$, $y_{AoA}$ from the AoA localization module 600 provides an additional estimate of the location of the object.

In the example of FIG. 6 the joint ToA/AoA estimate module 406 is also configured to provide an additional estimate of the location $\tilde{x}$, $\tilde{y}$. The additional estimate of the location $\tilde{x}$, $\tilde{y}$ that is generated by the joint Toa/AoA estimate module 406 is generated by using first category of parameters and the second category of parameters.

The system 100 shown in FIG. 6 therefore generates multiple different estimates of the location using different combinations of the parameters. The adjusted location estimator module 602 is configured to receive multiple different estimates of the location as inputs and process these to generate an adjusted location estimate $\hat{x}$, $\hat{y}$, $\hat{\theta}$. The adjusted location estimate $\hat{x}$, $\hat{y}$, $\hat{\theta}$ can comprise an estimate of orientation in addition to a coordinate location.

In the example of FIG. 6 the adjusted location estimator module 602 receives multiple inputs. The inputs comprise the estimate of the location, $x_{ToA}$, $y_{ToA}$ from the synchronous ToA localization module 410, the additional estimate of the location, $x_{AoA}$, $y_{AoA}$ from the AoA localization module 600, the additional estimate of the location $\tilde{x}$, $\tilde{y}$ from the joint Toa/AoA estimate module 406, improved clock offset estimate $\hat{\tau}_c$, and the improved orientation estimate $\hat{\theta}$. Other inputs or combinations of inputs could be used in other examples.

The adjusted location estimator module 602 is configured to fuse, combine or select the respective input estimates of location to provide the adjusted location estimate $\hat{x}$, $\hat{y}$, $\hat{\theta}$ as an output. In many practical cases of acoustic localization, it is easier to achieve a higher accuracy from ToA localization than from AoA localization. The angle of arrival computation, such as that obtained by the biased AoA estimate module 404, is considerably more complex than the time of flight computation, such as that used by the ToF estimate module 402. Furthermore, the angle of arrival estimation is significantly more sensitive to timing errors in the detection of the direct path. Even small timing errors in the direct path can lead to large angle errors. Whereas for time of flight estimation, the resulting errors are limited. As a consequence, the adjusted location estimator module 602 can be designed so that it selects the estimate of the location, $x_{ToA}$, $y_{ToA}$ from the synchronous ToA Localization module 410 so that $\hat{x}=x_{ToA}$ and $\hat{y}=y_{ToA}$. This can then be combined with the improved orientation estimate $\hat{\theta}$ to provide the adjusted location estimate $\hat{x}$, $\hat{y}$, $\hat{\theta}$.

In some examples the adjusted location estimator module 602 can be configured to use fusion estimation algorithms such as covariance intersection, ToA versus AoA geometrical accuracy for given beacon constellation which can also be known as Geometrical Dilution of Precision (GDOP), extended Kalman filtering or any other suitable technique.

Figure 7:
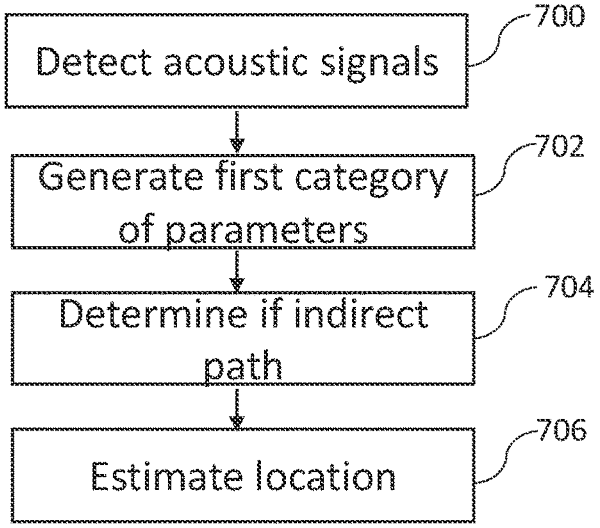
FIG. 7 shows an example method.

FIG. 7 shows another example method that can be used to localize an object in some examples of the disclosure. In the example of FIG. 7 a fallback mode can use a reduced number of acoustic signals for localization if one or more of the acoustic signals is blocked.

The object that is to be localized can be a receiving localization node 102 or a transmitting localization node 102. Whether the object that is to be positioned is a receiving localization node 102 or a transmitting localization node 102 depends on the architecture of the system 100. That is, it will depend on whether a forward architecture or a reverse architecture is used for the system 100.

The method comprises, at block 700, detecting three or more acoustic signals originating from three or more acoustic sources. The acoustic source can be a sound emitting transducer such as a loudspeaker. The acoustic sources can be part of transmitting localization nodes 102 or any other suitable entities.

The object to be localized can be in the same environment as one or more acoustic sources and two or more microphones for detecting acoustic signals. The acoustic sources and the microphones 110 can be part or localization nodes 102.

The acoustic signals can be in the audible range and/or in the ultrasonic range.

The acoustic signals can comprise unique signal sequences. The signal sequences can comprise a chirp/sweep signal, or a pseudo-random noise sequence or any other suitable type of signal.

The detection of the acoustic signals can comprise the identifying of the signal sequence in the acoustic signals. The process of the detection can comprise the acquisition of the acoustic signal by one or more microphones 110 and the conversion of the acoustic signal into an electric signal. The process of the detection can also comprise converting an analog electric signal to a digital signal. The process of the detection can also comprise identifying the signal sequence by correlating the acquired acoustic signal with the transmitted signal (as it is performed by a matched filter) and applying a threshold.

At block 702 the method comprises generating a first category of parameters for the two or more detected acoustic signals.

The first category of parameters can comprise three or more time of flight parameters. The time of flight parameters can comprise an indication of the time of flight of the acoustic signals between a transmitter and a receiver. The time of flight parameters can be adjusted or biased.

At block 704 the method comprises determining if one or more of the detected acoustic signals is an indirect path signal from a transmitter to a receiver. An acoustic signal can be determined to be an indirect path signal if it is blocked or obstructed so that there is some deflection or reflection of the acoustic signal.

At block 704 the method comprises estimating a location of an object associated with the detected acoustic signals using at least the first category of parameters and a timing parameter. The timing parameter that is used is determined based on whether an indirect signal has been detected. An instantaneous timing parameter is used to estimate the location if it is not determined that one or more of the detected acoustic signals is an indirect path signal from a transmitter to a receiver. This would occur if all of the signals are direct path signals from the transmitter to the receiver.

Conversely, a predicted timing parameter is used to estimate the location if it is determined that one or more of the detected acoustic signals is an indirect path signal from a transmitter to a receiver. This would occur if at least one of the signals are indirect path signals from the transmitter to the receiver.

The instantaneous timing parameter can be estimated using any suitable means. In some examples the instantaneous timing parameter can be estimated using the first category of parameters for the three or more detected acoustic signals. The predicted timing parameter is predicted based, at least in part, on previous estimates of the instantaneous timing parameter.

The timing parameter could be an indication of a relative delay between the respective acoustic signals or could be indications of the respective times at which they arrived. The timing parameter can comprise a clock offset or any other suitable type of parameter.

In some examples the method can comprise generating a second category of parameters for the three or more detected acoustic signals and estimating an orientation of the object associated with the detected acoustic signals. The orientation can be estimated using at least the second category of parameters and an orientation parameter. The orientation parameter that is used can be dependent upon whether an indirect signal is detected. An instantaneous orientation parameter can be used if it is not determined that one or more of the detected acoustic signals is an indirect path signal from a transmitter to a receiver. This would occur if all of the signals are direct path signals from the transmitter to the receiver.

Conversely, a predicted orientation parameter can be used if it is determined that one or more of the detected acoustic signals is an indirect path signal from a transmitter to a receiver. This would occur if at least one of the signals are indirect path signals from the transmitter to the receiver.

In some examples the second category of parameters can comprise three or more angle of arrival parameters. The angle of arrival parameters can comprise an indication of the angle at which the acoustic signals arrive at the receiver. The angle of arrival parameters can be adjusted or biased.

The instantaneous orientation parameter can be estimated using any suitable means. In some examples the instantaneous orientation parameter can be estimated using the second category of parameters for the three or more detected acoustic signals. The predicted orientation parameter is predicted based, at least in part, on previous estimates of the instantaneous orientation parameter.

In some examples the method can also comprise generating one or more additional estimates of the location of the object associated with the detected acoustic signals. The additional estimates of the location can be generated using different parameters or inputs of parameters. In some examples an additional estimate of the location of the object associated with the detected acoustic signals can be generated by using the second category of parameters.

In some examples the method can comprise generating one or more additional estimates of the location of the object associated with the detected acoustic signals. The estimate of the location and the one or more additional estimates of the location can be processed to generate an adjusted estimate of the location of the object. This can result in a more accurate or reliable estimate of the location of the object. In some examples the adjusted estimate of the location of the object can comprise more information than the original estimate. For example, it can comprise information relating to the orientation of the object as well as the coordinate location.

The additional estimates can be generated using different procedures to the estimate generated using the method of FIG. 7. As an example, an additional estimate of the location of the object associated with the detected acoustic signals can be generated by using an orientation parameter and the second category of parameters. In some examples an additional estimate of the location of the object associated with the detected acoustic signals can be generated by using first category of parameters and the second category of parameters.

The adjusted estimate of the location of the object can be generated by using any suitable means or procedures. In some examples the adjusted estimate of the location can be generated by using one or more fusion estimation algorithms to combine parameters from two or more respective estimates of the location. The fusion estimation algorithms can comprise covariance intersection, Geometric Dilution of Precision (GDOP), extended Kalman filtering or any other suitable algorithms.

Figure 8:
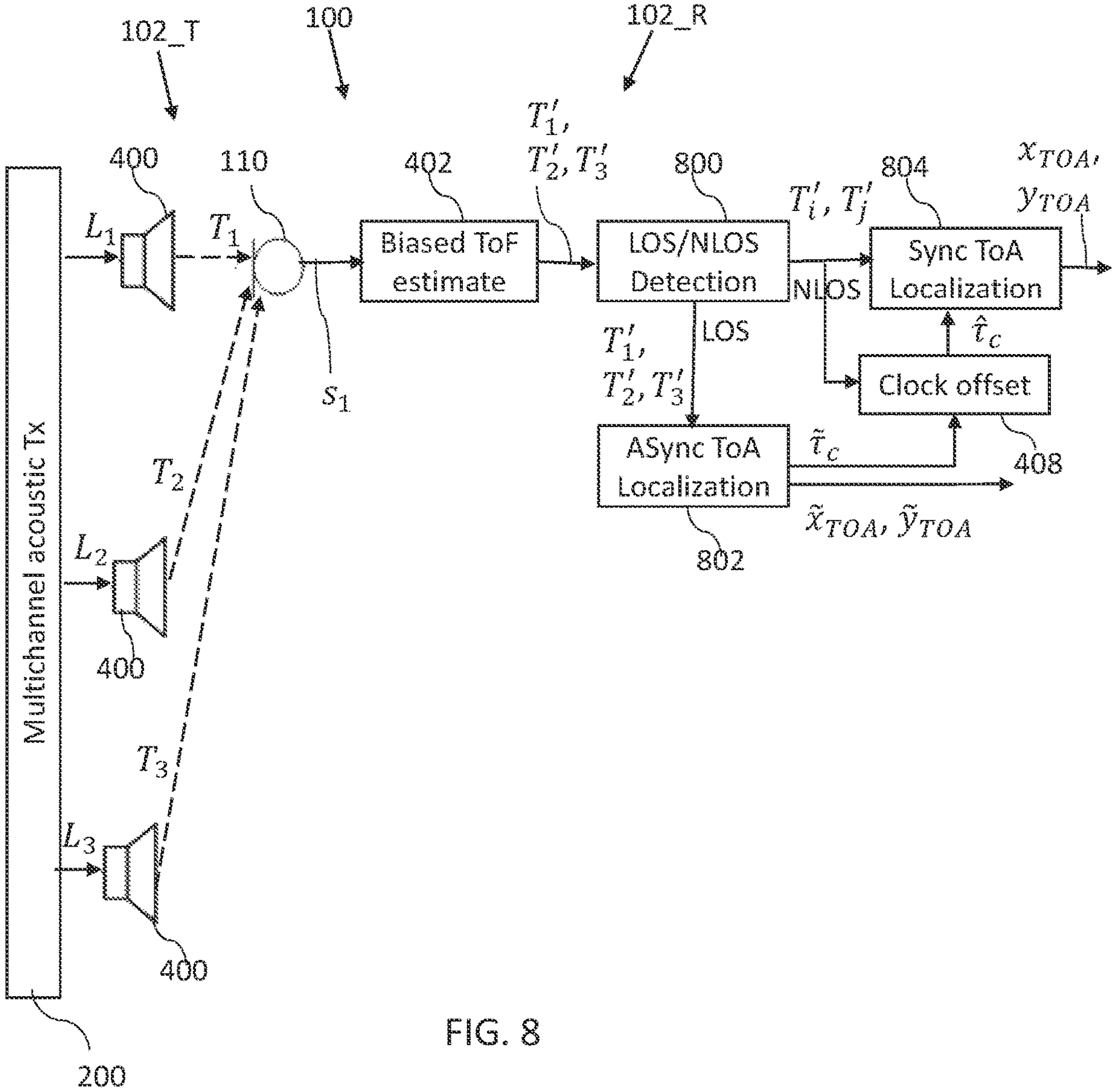
FIG. 8 shows an example acoustic localization system.

FIG. 8 schematically shows an example acoustic localization system 100 that could be used to implement examples of the disclosure. The example acoustic localization system 100 could be used to implement the example methods of FIG. 7 or any other suitable methods. The example system 100 of FIG. 8 can be used to enable localization of an object without using wireless synchronization. The system 100 of FIG. 8 does not need to use wireless transmitters or receivers to localize an object. The system 100 of FIG. 8 has a fallback mode that can use a reduced number of acoustic signals if one or more of the acoustic signals is blocked.

In this example the system 100 comprise a transmitting localization node 102_T and a receiving localization node 102_R. In the example of FIG. 5 the transmitting localization node 102_T is a multichannel node. The multichannel node comprises multiple acoustic sources 400.

In the example of FIG. 8 the transmitting localization node 102_T is configured to transmit three acoustic signals $L_1$, $L_2$, $L_3$. The transmitting localization node 102_T comprises a multi-channel acoustic transmitter 200 and multiple loudspeakers. The loudspeakers provide acoustic sources 400. In the example of FIG. 8 the transmitting localization node 102_T comprises three acoustic sources 400. In other examples the transmitting localization node 102_T can comprise more than three acoustic sources 400 and/or there can be more than one transmitting localization node 102_T.

The transmitting localization node 102_T provides the acoustic signals $L_1$, $L_2$, $L_3$ that can be used to localize an object. In examples of the disclosure at least three acoustic signals $L_1$, $L_2$, $L_3$ are provided. In the example of FIG. 8 a single transmitting localization node 102_T provides three acoustic signals $L_1$, $L_2$, $L_3$. In other examples a single transmitting localization node 102_T could provide more than three acoustic signals $L_1$, $L_2$, $L_3$ and/or the system 100 can comprise more than one transmitting localization node 102_T.

The acoustic signals $L_1$, $L_2$, $L_3$ can be in the audible range and/or the ultrasonic range. The acoustic signals $L_1$, $L_2$, $L_3$ can comprise signal sequences that enable the acoustic signals $L_1$, $L_2$, $L_3$ to be distinguished from each other.

In this example the receiving localization node 102_R comprises a microphone or microphone array 110, a biased Time of Flight (ToF) estimate module 402, a Line of Sight (LOS)/Non Line of Sight (NLOS) detection module 800, an asynchronous ToA localization module 802, a synchronous ToA localization module 804, and a clock offset prediction module 408. The receiving localization node 102_R can comprise other components in other examples.

In the example of FIG. 8 the microphone 110 can be a single microphone or an array of microphones. The microphone or microphone array 110 detects the acoustic signals $L_1$, $L_2$, $L_3$ that have been transmitted from the acoustic sources 400. The microphone or microphone array 110 provides the microphone signal $s_1$ as an output.

The receiving localization node 102_R is configured so that the microphone signal $s_1$ is provided to the biased ToF estimate module 402.

The biased ToF estimate module 402 is configured to generate a first category of parameters for the detected acoustic signals $L_1$, $L_2$, $L_3$. In this example the first category of parameters are biased time of flight estimates.

The biased ToF is estimated from a single microphone signal $s_1$. To estimate the biased ToF the start of the transmitted signal sequence is detected. To improve the detection of this sequence, a matched filter can be applied to the received signal. that is, the cross correlation between the received signal and the reversed transmitted signal is computed.

The biased ToF estimation module 402 is configured to calculate the ToF for the respective acoustic signals $L_1$, $L_2$, $L_3$. The ToF is calculated with a common bias for each of the acoustic signals $L_1$, $L_2$, $L_3$. The common bias is the unknown clock offset.

The biased ToF estimation module 402 provides biased time of flight estimates $$T_1', T_2', T_3'$$

as an output.

The biased time of flight estimates $$T_1', T_2', T_3'$$

are provided as an input to the LOS/NLOS detection module 800. The LOS/NLOS detection module 800 is configured to detect if one or more of the detected acoustic signals $L_1$, $L_2$, $L_3$ is an indirect path signal from a transmitter to a receiver. An indirect path signal is a signal that is blocked or obstructed so that there is some deflection or reflection of the signal. An indirect signal is an NLOS signal and a direct signal is an LOS signal.

Any suitable method or process can be used to detect if one or more of the detected acoustic signals $L_1$, $L_2$, $L_3$ is an LOS or NLOS signal. In some examples an NLOS signal can be detected by tracking the positions of the signal sequence or other suitable beacon in the matched filter output. The signal sequences can be sent repetitively at a frequency $f_p$ (the frame rate), that is, at a time interval of $T_f=1/f_p$. For a maximum velocity $v_{max}$ of a mobile node, the mobile node can move a maximum distance of $d=v_{max}\cdot T_f$ within an update or frame interval. That means, for a speed of sound c, a new signal sequence arrives within a time window of $T_f \pm d/c$ of the previous signal sequence. Therefore, if a new signal sequence arrives outside of this time window it can be determined that the signal is an NLOS signal. In a similar way, other constraints can be derived from the maximum angular velocity, and from the level of the signal. These constraints can then be used as a check for LOS/NLOS of the detected acoustic signals $L_1$, $L_2$, $L_3$.

The example system 100 of FIG. 8 comprises both an asynchronous ToA localization module 802 and a synchronous ToA localization module 804. The asynchronous ToA localization module 802 can be used if it is not determined that one or more of the detected acoustic signals $L_1$, $L_2$, $L_3$ is an indirect path signal from a transmitter to a receiver. That is, if all of the detected acoustic signals $L_1$, $L_2$, $L_3$ are LOS signals then the asynchronous ToA localization module 802 can be used. Conversely the synchronous ToA localization module 804 can be used if it is determined that one or more of the detected acoustic signals $L_1$, $L_2$, $L_3$ is an indirect path signal from a transmitter to a receiver. That is, if one or more of the detected acoustic signals $L_1$, $L_2$, $L_3$ are NLOS signals then the synchronous ToA localization module 804 can be used.

If all of the detected acoustic signals $L_1$, $L_2$, $L_3$ are LOS signals then all of the biased time of flight estimates $$T_1', T_2', T_3'$$

are provided to the asynchronous ToA localization module 802. The asynchronous ToA localization module 802 can be configured to generate an instantaneous timing parameter and use the instantaneous timing parameter to provide an estimate of the location $\tilde{x}_{ToA}$, $\tilde{y}_{ToA}$ of the object. In this example the instantaneous timing parameter is an instantaneous clock offset $\tilde{\tau}_c$. Other types of timing parameter can be estimated in other examples.

The asynchronous ToA localization module 802 can provide the estimate of the location $\tilde{x}_{ToA}$, $\tilde{y}_{ToA}$ of the object and the instantaneous clock offset $\tilde{\tau}_c$ as outputs.

If one or more of the detected acoustic signals $L_1$, $L_2$, $L_3$ is an NLOS signal then a subset of the biased time of flight estimates $$T_1', T_2', T_3'$$

are provided to the synchronous ToA localization module 804. The subset of the biased time of flight estimates $$T_1', T_2', T_3'$$

can comprise at least two of the biased time of flight estimates $$T_1', T_2', T_3'.$$

The synchronous ToA localization module 804 can be configured to use a predicted timing parameter to provide an estimate of the location $x_{ToA}$, $y_{ToA}$ of the object as an output.

In this example the predicted timing parameter is a predicted clock offset $\tilde{\tau}_c$. Other types of timing parameter can be estimated in other examples.

The predicted clock offset $\tilde{\tau}_c$ is provided by the clock offset prediction module 408. The clock offset prediction module 408 is configured to receive the instantaneous clock offset $\tilde{\tau}_c$ as an input and generate an improved clock offset estimate $\hat{\tau}_c$. FIGS. 11 to 13 show examples of a clock offset prediction module 408. Other configurations of the clock offset prediction block 408 could be used.

In the example of FIG. 8 the clock offset prediction module 408 can receive an input from the LOS/NLOS detection module 800 to indicate if an NLOS signal has been detected. The clock offset prediction module 408 can therefore control the clock offset update procedure and generate the predicted clock offset $\tilde{\tau}_c$ in response to an LOS/NLOS signal being detected.

The system 100 of FIG. 8 therefore provides two different methods for obtaining an estimate of the location. The first method comprises using the first category of parameters and an instantaneous timing parameter. This can be used if all of the detected acoustic signals $L_1$, $L_2$, $L_3$ are LOS signals. The second method is a fallback method that can be used if one or more of the detected acoustic signals $L_1$, $L_2$, $L_3$ are NLOS signals. The second method comprises using the first category of parameters and a predicted timing parameter. The predicted timing parameter can be predicted from previous values of the instantaneous timing parameter.

Figure 9:
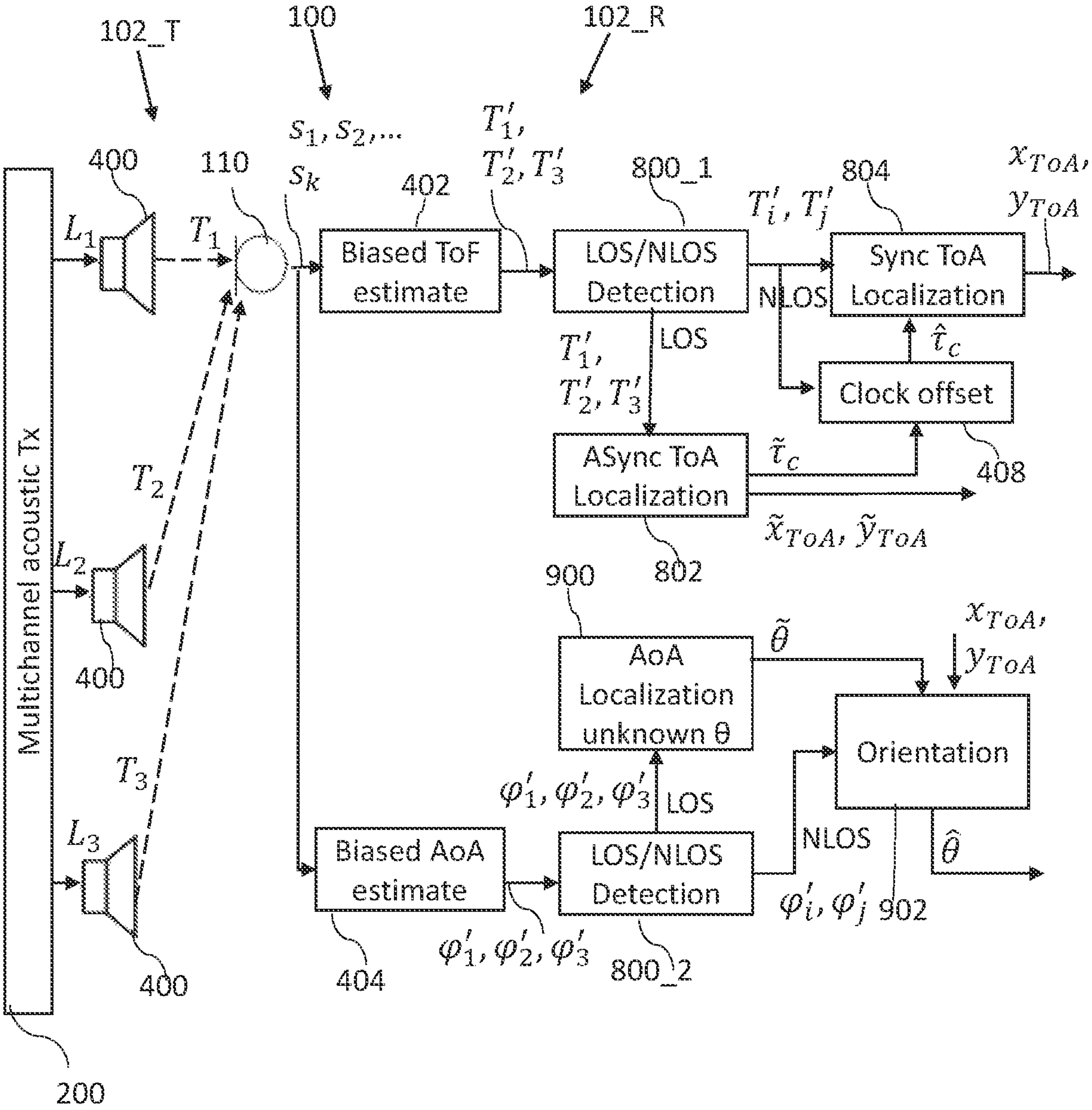
FIG. 9 shows an example acoustic localization system.

FIG. 9 schematically shows another example acoustic localization system 100 that could be used to implement examples of the disclosure. The example acoustic localization system 100 shown in FIG. 9 is similar to the system 100 shown in FIG. 8. In the example of FIG. 9 the transmitting localization node 102_T is a multichannel node. The multichannel node comprises multiple acoustic sources 400. In the system 100 of FIG. 9 the receiving localization node 102_R comprises, a microphone array 110 a biased AoA estimation module 404, a second LOS/NLOS detection module 800_2, an AoA localization module 900, and an orientation module 902. The system 100 could comprise other components in other examples.

In the example of FIG. 9 the microphone array 110 comprises K microphone elements. The microphone array 110 can have any suitable geometry. For example, the microphone array 110 could be linear, circular, or spherical or any other suitable shape. The microphone array 110 can have any suitable dimensions. The dimensions that are used for the microphone array 110 can depend on the frequency range of the acoustic signals $L_1$, $L_2$, $L_3$. As an example, for ultrasonic localization in the frequency range of 20 kHz to 30 kHz, a circular microphone array 110 with a diameter of 1 cm may be suitable. Furthermore, for many applications an array with K=6 microphone elements may be adequate. Other configurations for the microphone array 110 could be used in other examples.

The microphone array 110 detects the acoustic signals $L_1$, $L_2$, $L_3$ that have been transmitted from the acoustic sources 400. Microphone array 110 is configured to provide the microphone signals $s_1$, $s_2$, . . . , $s_K$ of the K microphone elements in the array as an output.

In the example of FIG. 9 the receiving localization node 102_R is configured so that the microphone signals $s_1$, $s_2$, . . . , $s_K$ are provided to the biased AoA estimation module 404.

The biased AoA estimate module 404 is configured to generate a second category of parameters for the detected acoustic signals $L_1$, $L_2$, $L_3$,. In this example the second category of parameters are biased angle of arrival estimates.

The biased AoA is estimated from multiple microphone signals $s_1$, $s_2$, . . . , $s_K$. Any suitable process can be used to estimate the angle of arrival from the microphone signals $s_1$, $s_2$, . . . , $s_K$. The angles of arrival are calculated with a common bias for each of the acoustic signals $L_1$, $L_2$, $L_3$. The bias of these angles is the unknown orientation θ of the object that is to be localized. The unbiased angles of arrival are $$\varphi_1 = \varphi_1' - \theta,\ \varphi_2 = \varphi_2' - \theta, \text{ and } \varphi_3 = \varphi_3' - \theta$$

The biased AoA estimation module 404 provides biased angle of arrival estimates $\varphi_1$, $\varphi_2$, $\varphi_3$ as an output.

The biased angle of arrival estimates $$\varphi_1', \varphi_2', \varphi_3'$$

are provided as an input to the second LOS/NLOS detection module 800_2. The second LOS/NLOS detection module 800_2 is configured to detect if one or more of the detected acoustic signals $L_1$, $L_2$, $L_3$ is an indirect path signal from a transmitter to a receiver. The second LOS/NLOS detection module 800_2 can be similar to the first LOS/NLOS detection module that receives the biased time of flight estimates $$T_1', T_2', T_3'$$

as an input. The second LOS/NLOS detection module 800_2 can be based on the maximum angular velocity and the frame duration. Alternatively, rather than using separate NLOS/LOS decision modules for ToA and AoA, a single LOS/NLOS decision module for ToA and AoA can be derived that combines both 800_1 and 800_2.

In the example of FIG. 9 the receiving localization node 102_R comprises both an AoA localization module 900 and an orientation module 902. The AoA localization module 900 can be used if it is not determined that one or more of the detected acoustic signals $L_1$, $L_2$, $L_3$ is an indirect path signal from a transmitter to a receiver. That is, if all of the detected acoustic signals $L_1$, $L_2$, $L_3$ are LOS signals then the AoA localization module 900 can be used. Conversely the orientation module 902 can be used if it is determined that one or more of the detected acoustic signals $L_1$, $L_2$, $L_3$ is an indirect path signal from a transmitter to a receiver. That is, if one or more of the detected acoustic signals $L_1$, $L_2$, $L_3$ are NLOS signals then the orientation module 902 can be used.

If all of the detected acoustic signals $L_1$, $L_2$, $L_3$ are LOS signals then all of the biased angle of arrival estimates $$\varphi_1', \varphi_2', \varphi_3'$$

are provided to the AoA localization module 900. The AoA localization module 900 can be configured to use the biased angle of arrival estimates $$\varphi_1', \varphi_2', \varphi_3'$$

to provide an estimate of the orientation of the object $\tilde{\theta}$ as an output. That is the AoA localization module 900 uses the second category of parameters to estimate the orientation of the object $\tilde{\theta}$. This estimation can be an instantaneous orientation parameter.

The AoA localization module 900 can also be configured to provide an additional estimate of the location $x_{AoA}$, $y_{AoA}$. of the object. This is not shown in FIG. 9.

If one or more of the detected acoustic signals $L_1$, $L_2$, $L_3$ is an NLOS signal then a subset of the biased angle of arrival estimates $$\varphi_1', \varphi_2', \varphi_3'$$

are provided to the orientation module 902. The subset of the biased angle of arrival estimates $\varphi_1$, $\varphi_2$, $\varphi_3$ can comprise at least two of the biased angle of arrival estimates $$\varphi_1', \varphi_2', \varphi_3'.$$

The orientation module 902 can be configured to use the biased angle of arrival estimates $$\varphi_1', \varphi_2', \varphi_3'$$

and an estimate of the location $x_{ToA}$, $y_{ToA}$ of the object to provide an estimate of the orientation $\hat{\theta}$ of the object that can be used when one or more of the detected acoustic signals $L_1$, $L_2$, $L_3$ is an NLOS signal. This estimate of the orientation $\hat{\theta}$ of the object can be an orientation parameter. The orientation parameter is generated from estimates of the orientation of the object, from estimates of the position, for example $x_{ToA}$, $y_{ToA}$, or from a subset of the biased angle of arrival estimates $$\varphi_1', \varphi_2', \varphi_3'.$$

Therefore, in the example system of FIG. 9, if one or more of the signals is an indirect signal the output of the orientation module 902 can be used to provide a predicted estimate of the orientation $\hat{\theta}$ of the object. However, if all of the signals are LOS or direct signals then the output of the AoA localization module 900 provides an instantaneous estimate of the orientation of the object $\tilde{\theta}$ as an output.

Figure 10:
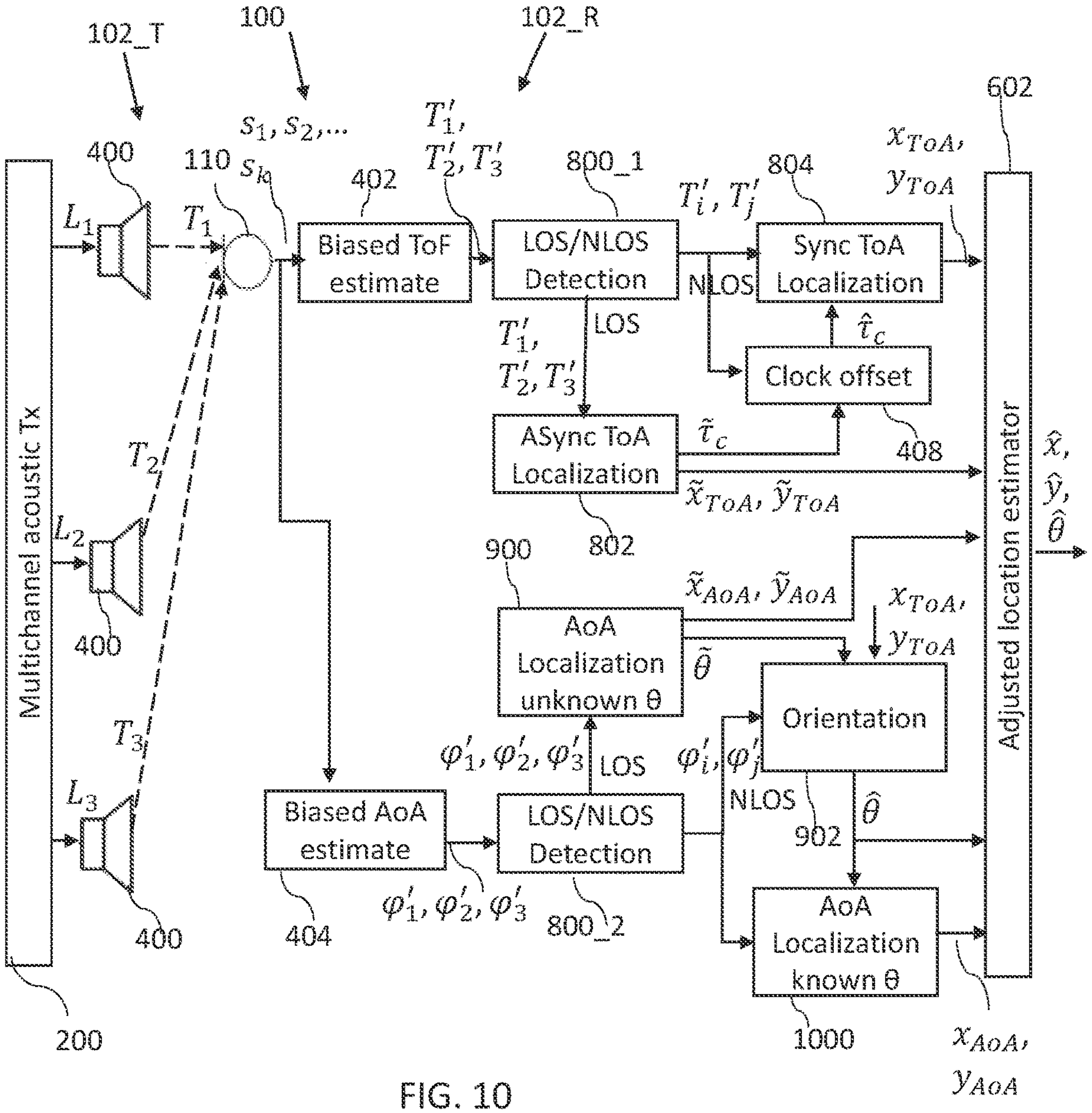
FIG. 10 shows an example acoustic localization system.

FIG. 10 schematically shows another example acoustic localization system 100 that could be used to implement examples of the disclosure. The example acoustic localization system 100 shown in FIG. 10 is similar to the system 100 shown in FIG. 9. In the example of FIG. 10 the transmitting localization node 102_T is a multichannel node. The multichannel node comprises multiple acoustic sources 400. In the system 100 of FIG. 10 the receiving localization node 102_R comprises another AoA localization module 1000 and an adjusted location estimator module 602.

The AoA localization module 1000 shown in FIG. 10*is* configured to use, at least an orientation parameter and the second category of parameters to determine another estimate of a location of either the receiving localization node 102_R or the transmitting localization node 102_T. The orientation parameter used by the AoA localization module 1000 of FIG. 10 is the orientation parameter $\hat{\theta}$ that is output by the orientation module 902.

The AoA localization module 1000 of FIG. 10 can be configured to perform an analogous function to the synchronous ToA localization module 410 in that it uses a predicted parameter to provide an estimate of a location.

The system 100 shown in FIG. 10 therefore generates multiple different estimates of the location using different combinations of the parameters. The adjusted location estimator module 602 is configured to receive multiple different estimates of the location as inputs and process these to generate an adjusted location estimate $\hat{x}$, $\hat{y}$, $\hat{\theta}$. The adjusted location estimate $\hat{x}$, $\hat{y}$, $\hat{\theta}$ can comprise an estimate of orientation in addition to a coordinate location.

In the example of FIG. 10 the adjusted location estimator module 602 receives multiple inputs. The inputs comprise the estimate of the location, $x_{ToA}$, $y_{ToA}$ from the synchronous ToA localization module 804, an additional estimate of the location, $x_{AoA}$, $y_{AoA}$ from the AoA localization module 1000 of FIG. 10, an additional estimate of the location $\tilde{x}_{ToA}$, $\tilde{y}_{ToA}$. from the asynchronous ToA localization module 802, an additional estimate of the location $\tilde{x}_{AoA}$, $\tilde{y}_{AoA}$ from the AoA localization module 900, a predicted clock offset estimate $\hat{\tau}_c$ from a clock offset prediction module 408 and a predicted orientation estimate $\hat{\theta}$ from an orientation module 902. Other inputs or combinations of inputs could be used in other examples.

The adjusted location estimator module 602 is configured to fuse, combine or select the respective input estimates of location to provide an adjusted location estimate $\hat{x}$, $\hat{y}$, $\hat{\theta}$ as an output.

FIG. 11 shows an example method that can be used by a clock offset prediction module 408. The clock offset prediction module 408 is configured to keep track of the clock or time offset between the transmitting localization node 102_T and the receiving localization node 102_R. The example clock offset prediction module 408 of FIG. 11 can be used in example systems 100 that use a fallback option for using predicted parameters to estimate locations when one or more of the acoustic signals are blocked such as the systems of any of FIGS. 8 to 10. Other types of clock offset prediction modules 408 can be used in other example systems.

The clock offset arises because the time at which the acoustic signal was transmitted is unknown and also because the clock drift between the transmitting localization node 102_T and the receiving localization node 102_R is unknown. The clock offset can be derived in terms of the audio clock of the receiving localization node 102_R. if this audio clock is not ticking at exactly at the same speed as the audio clock of the transmitting localization node 102_T then the clock offset will drift. Although both the transmitting localization node 102_T and the receiving localization node 102_R may generate an audio clock at the same nominal frequency, such as 48 kHz, each node has its own quartz crystal oscillator that determines the precise sampling frequency. As a result, the sampling frequencies can deviate slightly, even if just a few ppm. Nevertheless, this deviation needs to be taken into account in order to accurately track and update the clock offset.

The clock drift is determined by the sampling frequency offset between the transmitting localization node 102_T and the receiving localization node 102_R. Assuming a sampling frequency $f_s$ for the receiving localization node 102_R and a slightly deviating sampling frequency $$f_s' = f_s + \Delta f$$

for the transmitting localization node 102_T (with positive or negative Δf), then the clock drift for a frame is $$\Delta t = N_f\left(\frac{1}{f_s + \Delta f} - \frac{1}{f_s}\right),$$

where $N_f$ is the number of samples in a frame.

The receiving localization node 102_R does not have access to the sampling frequency $$f_s'$$

of the transmitting localization node 102_T. However, this can be derived from the calculated instantaneous clock offset $\tilde{\tau}(i)$ by linear regression.

A first-order or second-order polynomial (least squares fit) can be fitted to the data of $\tilde{\tau}(i)$ in a recursive way. A second-order polynomial for $\tau_c(i)$ can be written in the form of $\tau_c(i)=a_i+b_i i+c_i i^2$. Estimates for the parameters $a_i$, $b_i$, and $c_i$ can be found in various ways. Since these parameters can change over time, an adaptive update of these parameters can be used. Two examples for an adaptive least square fit algorithm are explained below. These are, a sliding window least squares fit, and a gradient-type least squares fit. For illustration purpose, a conventional notation for the polynomial, denoting the independent variable as $x_i$, the dependent variable as $y_i$, is used and a random zero-mean error term $\epsilon_i$ is assumed $$y_i = a_i + b_i x_i + c_i x_i^2 + \epsilon_1 \tag{1}$$

Note, this notation replaces the time index variable i with $x_i$, and the clock offset variable $\tau_c(i)$ with $y_i$. To derive a sliding window recursive least square fit, Equation (1) can be extended and written in matrix notation, that is, $$y_i = X_i p_i + \epsilon_i \tag{2}$$

where $$y_i = \begin{bmatrix} y_{i-M+1} \\ \vdots \\ y_{i-1} \\ y_i \end{bmatrix} \quad X_i = \begin{bmatrix} 1 & x_{i-M+1} & x_{i-M-1}^2 \\ \vdots & \vdots & \vdots \\ 1 & x_{i-1} & x_{i-1}^2 \\ 1 & x_i & x_i^2 \end{bmatrix} \quad p_i = \begin{bmatrix} a_1 \\ b_i \\ c_i \end{bmatrix} \quad \epsilon_i = \begin{bmatrix} \epsilon_{i-M+1} \\ \vdots \\ \epsilon_{i-1} \\ \epsilon_i \end{bmatrix}$$

with a size M of the sliding window. The minimum least squares estimate for the polynomial parameters in equation (2) is $$\hat{p}_i = \left(X_i^T X_i\right)^{-1} X_i^T y_i \tag{3}$$

That means, once M clock offset measurements $y_i$ are available, the polynomial parameters $\hat{p}_i$ can be determined.

Using the pseudo-inverse (aka Moore-Penrose inverse), $$X_i^+ = \left(X_i^T X_i\right)^{-1} X_i^T \tag{4}$$

vector $\hat{p}_i$ can be expressed as $$\hat{p}_i = X_i^+ y_i \tag{5}$$

Rather than applying a sliding window, a block of data $y_i$ can be processed only every M clock offset measurements. That is, equation (3) would only be evaluated every M clock offset measurements. However, this means the polynomial parameter estimate $\hat{p}_i$ will be updated only every M clock offset measurements, thus potentially delaying clock offset adjustments and, as a result, reducing localization accuracy.

When a sliding window is applied to solve for the polynomial parameter estimate $\hat{p}_i$, Equation (3) is evaluated after each new clock offset measurement, that is, for each time index i. To reduce the number of computations, a recursive algorithm for this least squares fit can be derived. Denoting the input matrix product $$X_i^T X_i$$

in terms of the previous product $$X_{i-1}^T X_{i-1},$$

that is, $$X_i^T X_i = X_{i-1}^T X_{i-1} + x_i x_i^T - x_{i-M} x_{i-M}^T \tag{6}$$

where $$x_i = \begin{bmatrix} 1 \\ x_i \\ x_i^2 \end{bmatrix}. \tag{7}$$

This results in a sliding window recursive least squares fit with the polynomial parameter vector at time i expressed in terms of the previous parameter vector at time i−1, that is, $$\hat{p}_i = \hat{p}_{i-1} + \left(X_i^T X_i\right)^{-1}\left(-x_i x_i^T \hat{p}_{i-1} + x_{i-M} x_{i-M}^T \hat{p}_{i-1} + x_i y_i - x_{i-M}\, y_{i-M}\right) \tag{8}$$

This algorithm can be initialized at the startup time (that is, at time index i=0) by setting $X_0$ to a null matrix, $y_0$ to a null vector, and $p_0$ to a null vector (i.e., $a_0=y_0$, $b_0=0$, and $c_0=0$). In addition, a counter for the number of successive NLOS frames is initialized, that is, $n_{NLOS}=0$.

An NLOS condition occurs in a system 100 for detecting at least three acoustic signals, such as the systems 100 of FIGS. 8 to 10, when one or more of the acoustic signals is blocked by an object or person. When this occurs the coefficient vector $p_i$ can no longer be updated because $y_i$ is no longer available. However, in this case, the previous polynomial parameters can be used, that is $$\hat{p}_i = \hat{p}_{i-1} \tag{9}$$

and the clock offset can be estimated using $$\hat{y}_i = \hat{p}_i^T x_i \tag{10}$$

Equation (1) shows a second-order polynomial, however a first-order polynomial (that, is $c_i=0$) is often sufficient to track changes of the clock offset. Even in a startup phase, where a transmitting localization node 102_T and a receiving localization node 102_R may be exposed to different temperature changes, which in turn results in a second order drift component, such changes are slow compared to the frame data rate. As a result, an adaptive (or window-based) first order polynomial model is often sufficient to track the clock offset. This in turn simplifies the evaluation of Equation (8) since only the two polynomial parameters $a_i$ and $b_i$ need to be estimated.

The example clock offset prediction method shown in FIG. 11 can be used in systems 100 that are configured to detect whether one or more of the acoustic signals is obstructed and uses the above equations.

At block 1100 the method comprises the initialization. The initialization can comprise setting $X_0$ to a null matrix, $y_0$ to a null vector, and $p_0$ to a null vector (i.e., $a_0=y_0$, $b_0=0$, and $c_0=0$). A counter for the number of successive NLOS frames is also initialized, that is, $n_{NLOS}=0$.

The initialization is followed, at block 1102 by an incrementation of the iteration counter i.

At block 1104 it is determined if one or more of the detected acoustic signals is an indirect path signal from a transmitter to a receiver. That is, it is determined if the required number of LOS signals are received. An input from an LOS/NLOS detection module 800 can be used to determine if the required number of LOS signals have been received. A code can be assigned to indicate if the required number of LOS signals have been received. For instance, a Boolean variable LOS(i)=true can indicate that the required number of LOS signals have been received and a Boolean variable LOS(i)=false can indicate that the required number of LOS signals have not been received.

If the required number of LOS signals have been received the clock offset is estimated. In this example the estimation comprises updating the polynomial coefficients for the clock offset. Conversely, if the required number of LOS signals have not been received the clock offset is predicted. The required number of LOS signals might not be received if one or more of the signals is an NLOS signal. In this example the polynomial coefficients for the clock offset from the previous iteration are used to predict the clock offset.

In the example of FIG. 11, if the required number of LOS signals have been received then the method proceeds to block 1106. At block 1106 it is detected whether a transition from NLOS signals to LOS signals has occurred. This provides the option of resetting the algorithm after a long NLOS condition.

The transition from NLOS signals to LOS signals can be detected using any suitable process. For instance, an NLOS-to-LOS transition can be detected at block 1106 as follows:

NLOS−to−LOS transition $$LOS(i-1) == \text{false} \ \&\& \ LOS(i) == \text{true} \tag{11}$$

If this transition is determined to occur the NLOS counter $n_{NLOS}$ can be evaluated. If the NLOS counter $n_{NLOS}$ is above a predetermined threshold, $n_{NLOS}>N_{NLOS}$, then the algorithm is reset. The threshold $N_{NLOS}$ can be set depending on the system's accuracy. This can result in an $N_{NLOS}$ in the order of 1,000 . . . 10,000.

After the NLOS-to-LOS transition detection the method proceeds to block 1108 and a new instantaneous clock offset is read. This clock offset can be a measurement. At block 1110, the circular buffer is updated. That is, the circular buffer pointer is incremented in modulo M convention, and the oldest instantaneous clock offset $y_{i-M}$ is read from that memory location, while the new instantaneous clock offset $y_i$ (read in the previous block) is written into this memory location.

At block 1112 the input matrix is updated according to equation (6). At block 1114 the polynomial coefficient is updated according to equation (8). At block 1116 the clock offset is updated according to equation (10).

If, at block 1104, it is determined that the required number of LOS signals have not been received then the method proceeds to block 1118. At block 1118 it is detected whether a transition from LOS to NLOS has occurred.

In the example of FIG. 11, if the required number of LOS signals have been received then the method proceeds to block 1118 to detect a transition from LOS to NLOS signals. The transition from LOS signals to NLOS signals can be detected using any suitable process. For instance, a LOS-to-NLOS transition can be detected at block 1118 as follows:

LOS−to−NLOS transition $$LOS(i-1) == \text{true} \;\&\&\; LOS(i) == \text{false} \tag{12}$$

If this transition is detected, the NLOS counter is set to $n_{NLOS}=1$. If this transition is not detected then the NLOS counter $n_{NLOS}$ is incremented, that is $n_{NLOS}=N_{NLOS}+1$.

After the LOS-to-NLOS transition detection the method proceeds to block 1120 and the slope coefficient is updated according to equation (9). At block 1122 the clock offset is updated according to equation (10).

At block 1124, the circular buffer is updated. However, in this case there is no new instantaneous clock offset $y_i$ to write into the memory location (where the circular buffer pointer points to after it has been incremented). Instead of $y_i$, the estimate $\hat{y}_i$ is written into the memory location.

After both block 1116 and 1124 the method proceeds to block 1126 and the result of clock offset computation $\hat{y}_i$ is output. This completes the cycle and a new iteration starts.

In some examples the computations of the method can be simplified by using a first order polynomial fit. In some examples the recurring pseudo inverse equation (4) can be further simplified. To do this a least square fit from M clock offset measurements is calculated, and for this least square fit, the start index is irrelevant. This means that the same pseudo inverse can be used in each iteration, as long as the same corresponding $x_i$ vector is also used. In other words, the matrix $X_i$, which changes each iteration, is replaced with a constant matrix $X_M$, which remains the same for each iteration. Furthermore, in matrix $X_M$, the time sequence $[x_1, x_2, \ldots, x_M]^T$ column vector can be replaced with the time indices $[1,2, \ldots, M]^T$ column vector. (The resulting parameters estimate $\hat{p}_i$ is then also index based, but can be converted back to a time-based parameter estimate). For a first order fit, it can then be written $$X_M = \begin{bmatrix} 1 & 1 \\ 1 & 2 \\ \vdots & \vdots \\ 1 & M \end{bmatrix} \tag{13}$$

This means that, the pseudo inverse remains a constant matrix over all iterations, $$X_M^+ = \left(X_M^T X_M\right)^{-1} X_M^T \tag{14}$$

which in turn provides the polynomial parameters, $$\hat{p}_i = X_M^+ y_i \tag{15}$$

As a fixed input matrix $X_M$, is used a corresponding fixed $x_M=[1\ M]$ also needs to be used. This way, the clock offset estimate becomes $$\hat{y}_i = \hat{p}_i^T x_M \tag{16}$$

This would enable the method shown in FIG. 11 to be simplified by replacing the blocks 1112 to 1116 with blocks that resolve equations (15) and (16).

FIG. 12 shows another example method that can be used by a clock offset prediction module 408 such as the clock offset prediction module 408 in any of FIGS. 8 to 10. Other types of clock offset prediction modules 408 can be used in other example systems.

In this example a first order polynomial model for the clock offset is assumed, that is, $$y_i = a_i + b_i x_i + \epsilon_i \tag{17}$$

Using a recursive expression for the clock offset, this can be written $$y_i = y_{i-1} + b_i(x_i - x_{i-1}) + \epsilon_i \tag{18}$$

Equation (18) no longer contains the coefficient at, however, this coefficient can be estimated by $\hat{\alpha}_i=y_i-b_i x_i$.

The slope of the clock offset graph can be estimated from two measurements that are M measurement samples apart, that is:

$$\hat{b}_i = \frac{y_i - y_{i-M}}{x_i - x_{i-M}} \tag{19}$$

Assuming equidistant x values, this can be written $x_i - x_{i-1} = \Delta x$, and therefore $$\hat{b}_i = \frac{y_i - y_{i-M}}{M\Delta x} \tag{20}$$

This instantaneous slope estimate can be further improved by filtering, for example by applying a first order low-pass filter, $$\bar{b}_i = \alpha\bar{b}_{i-1} + (1-\alpha)\hat{b}_i \tag{21}$$

where $\bar{b}_i$ is the low-pass filtered slope coefficient and α the low-pass filter coefficient. The estimated clock offset can then be written as $$\hat{y}_i = \hat{y}_{i-1} + \bar{b}_i\Delta x - \mu e_{i-1} \tag{22}$$

where a correction term $-\mu e_{i-1}$ based on the gradient is added to remove any bias, with μ being the step size and $e_{i-1}$ being the previous clock offset estimation error. The clock offset error can be computed by $$e_i = \hat{y}_i - y_i \tag{23}$$

To initialize the algorithm given by equations (20)-(23) at the start up, the variables at time index i=0 can be set in the following way:

$$e_0 = 0 \tag{24}$$

$$\hat{y}_0 = y_0 \tag{25}$$

$$\bar{b}_0 = 0 \tag{26}$$

In addition, a counter for successive NLOS frames can be initialized, that is, $$n_{NLOS} = 0 \tag{27}$$

The iterative cycle can be started by incrementing the time index or iteration counter by one, that is, i=i+1. A buffer of size $M_b$ for the clock offset measurements $y_i$ can be assumed. This buffer can be implemented as a circular buffer, in which the oldest data point ($y_{i-M}$) is removed and a new data point ($y_i$) is written in its memory location. To accommodate the initial phase in which the $y_i$ buffer is filled up as the time index grows (i=1,2,3, . . . , $M_b$), the algorithm variable M is set based on the time index i, that is, $$\text{if } i \le M_b$$

$$M = i; \tag{28a}$$

$$\text{else}$$

$$M = M_b; \tag{28b}$$

$$\text{end}$$

This procedure is referred to as circular buffer management. If all of the signals are LOS, the equations (20)-(23) are executed. This cycle is repeated, that is, i is incremented by 1 and iterated until a NLOS signal is detected.

If an NLOS condition is detected (that is one signal, in a three signal system, is blocked by an object or person), the slope can then no longer be updated because $y_i$ is no longer available. Since slope changes take much longer than the duration of a single frame duration, it is possible to use a slope coefficient for several minutes in an NLOS condition. This duration is several order of magnitudes longer than the frame duration. That is, the previous slope can be reused for several iterations so as to set, $$\bar{b}_i = \bar{b}_{i-1} \tag{29}$$

A clock offset error can no longer be computed during the occurrence of NLOS conditions, therefore the gradient error correction term in the clock offset estimation is dropped, that is, $$\hat{y}_i = \hat{y}_{i-1} + \bar{b}_i\Delta x \tag{30}$$

The parameters of the algorithm equations (20)-(23) can be set, for example, as follows: $M_b$=20; α=0.98; μ=0.02.

The example clock offset prediction method shown in FIG. 12 can be used in systems 100 that are configured to detect whether on or more of the acoustic signals is obstructed and uses the above equations. For example, it can be used in the systems of FIGS. 8 to 10 which have a fallback option for using predicted parameters to estimate locations when one or more of the acoustic signals are blocked.

At block 1200 the method comprises the initialization. The initialization can comprise setting, $e_0=0$, $\hat{y}_0=y_0$, $\bar{b}_0=0$. A counter for the number of successive NLOS frames is also initialized, that is, $n_{NLOS}=0$.

The initialization is followed, at block 1202 by an incrementation of the iteration counter i.

At block 1204 it is determined if one or more of the detected acoustic signals is an indirect path signal from a transmitter to a receiver.

If the required number of LOS signals have been received the clock offset is estimated and the slope of the clock offset change is updated. Conversely, if the required number of LOS signals have not been received the clock offset is predicted and the slope of the clock offset from the previous iteration is used.

In the example of FIG. 12, if the required number of LOS signals have been received then the method proceeds to block 1206. At block 1206 it is detected whether a transition from NLOS signals to LOS signals has occurred. This provides the option of resetting the algorithm after a long NLOS condition. The transition from NLOS signals to LOS signals can be detected using any suitable process such as those described in relation to FIG. 11.

After the NLOS-to-LOS transition detection the method proceeds to block 1208 and a new instantaneous clock offset is read. At block 1210, the circular buffer is updated. That is, the circular buffer pointer is incremented in modulo M convention, and the oldest instantaneous clock offset $y_{i-M}$ is read from that memory location, while the new instantenous clock offset $y_i$ (read in the previous block) is written into this memory location. The size of the circular buffer may dynamically change, based on Equations. (28a) and (28b).

At block 1212 the slope coefficient is updated according to equation (21). At block 1214 the slope coefficient is filtered according to equation (21). At block 1216 the clock offset is updated according to equation (22). At block 1218 the error is updated according to equation (23).

In the example of FIG. 12, if the required number of LOS signals have been received then the method proceeds to block 1220 to detect a transition from LOS to NLOS signals. The transition from LOS signals to NLOS signals can be detected using any suitable process such as the process described above in relation to FIG. 11.

After the LOS-to-NLOS transition detection the method proceeds to block 1222 and the slope coefficient is updated according to equation (29). At block 1224 the clock offset is updated according to equation (30).

At block 1226 the circular buffer is updated. In this case a new instantaneous clock offset $y_i$ to write into the memory location (where the circular buffer pointer points to after it has been incremented) is not available. Therefore, instead of $y_i$, the estimate $\hat{y}_i$ into is written into the memory location.

After both block 1218 and 1226 the method proceeds to block 1228 and the result of clock offset computation $\hat{y}_i$ is output. This completes the cycle and a new iteration starts.

FIG. 13 shows another example method that can be used by a clock offset prediction module 408. The example clock offset prediction module 408 of FIG. 11 can be used in example systems 100 that use just two acoustic signals, such as the systems 100 of FIGS. 4 to 6.

The method used in FIG. 13 is similar to the method used in FIG. 12 in that it uses similar equations. So, at block 1300 the method comprises the initialization which can be as described in relation to FIG. 12. At block 1302 the method comprises an incrementation of the iteration counter i.

At block 1304 the method of FIG. 13 differs from the method of FIG. 12. Instead of determining if one or more of the detected acoustic signals is an indirect path signal from a transmitter to a receiver it is determined whether the joint ToA/AoA estimation of the clock offset is valid. The Joint ToA/AoA estimation of the clock offset can be provided as an output of the joint ToA/AoA estimate module 406.

The joint ToA/AoA estimation can be estimated to be valid based on constraints such as area constraints, dynamic positional constraints or any other suitable type of constraints. The area constraints could comprise excluding Joint ToA/AoA location results for certain areas known to provide poor AoA localization. The dynamic positional constraints could comprise excluding Joint ToA/AoA location results that represent large positional changes.

In the example of FIG. 13, if it is determined that the joint ToA/AoA estimation is valid then the method proceeds to block 1306. At block 1306 it is detected whether a transition from non-valid estimations to valid estimations has occurred. The transition from non-valid estimations to valid estimations can be detected using any suitable process such as those described for detecting transitions in relation to FIG. 11.

After the non-valid to valid transition detection the method proceeds to block 1308 and a new instantaneous clock offset is read. At block 1310, the circular buffer is updated. The circular buffer can be updated as described in relation to FIG. 12.

At block 1312 the slope coefficient is updated according to equation (20). At block 1314 the slope coefficient is filtered according to equation (21). At block 1316 the clock offset is updated according to equation (22). At block 1318 the error is updated according to equation (23).

If it is determined that the joint ToA/AoA estimation is not valid then the method proceeds to block 1320 to detect a transition from valid to non-valid estimations. The transition from valid estimations to non-valid estimations can be detected using any suitable process such as those described for detecting transitions in relation to FIG. 11 or those opposite to described for detecting transitions from non-valid to valid estimates in module 1306.

After the valid to non-valid transition detection the method proceeds to block 1322 and the slope coefficient is updated according to equation (29). At block 1324 the clock offset is updated according to equation (30).

At block 1326 the circular buffer is updated. This can be updated as described in relation to FIG. 12.

After both block 1318 and 1326 the method proceeds to block 1328 and the result of clock offset computation $\hat{y}_i$ is output. This completes the cycle and a new iteration starts.

In the example of FIG. 13 the method analogous to the method of FIG. 12 is implemented for an example system 100 that use just two acoustic signals, such as the systems 100 of FIGS. 4 to 6. In other examples a method analogous to the method of FIG. 11, or any other suitable method, could be used for such systems.

FIG. 14 shows an example orientation module 902 that can be used in some examples of the disclosure. The orientation module 902 is configured to generate an improved orientation estimate $\hat{\theta}$. The orientation module 902 can be used in systems 100 such as the systems 100 of FIGS. 9 to 10 or any other suitable system 100.

The orientation module 902 has three inputs, the estimate of instantaneous orientation $\tilde{\theta}$, the estimate of the location $[x_{ToA}, y_{ToA}]$, and the LOS bit from the LOS/NLOS detection module that indicates if an NLOS signal has been detected. In this case NLOS and LOS are Boolean pairs. That is a signal can either be NLOS or LOS.

The orientation module 902 comprises a positional derivative module 1400. The estimate of the location $[x_{ToA}, y_{ToA}]$ is provided as an input to the positional derivative module 1400. The positional derivative module 1400 is configured to use the estimate of the location $[x_{ToA}, y_{ToA}]$ to calculate an alternative orientation estimate by using the derivative of the position. The derivative of the position is a velocity vector derived from consecutive positions. For example, an alternate orientation at time i can be determined using the position derivative, $$\tilde{\theta}_{ToA}(i) = a\tan\left(\frac{\delta y_{ToA}(i)}{\delta x_{ToA}(i)}\right) \tag{31}$$

which can be approximated as $$\tilde{\theta}_{ToA}(i) \approx a\tan\left(\frac{y_{ToA}(i) - y_{ToA}(i-1)}{x_{ToA}(i) - x_{ToA}(i-1)}\right) \tag{32}$$

This results in two orientation estimates $\tilde{\theta}(i)$ and $\tilde{\theta}_{ToA}(i)$ being available if an LOS condition is detected. If an NLOS condition is detected then, the orientation $\tilde{\theta}(i)$ cannot be calculated, because the equations for AoA localization with unknown orientation cannot be solved. However, the additional orientation estimate $\tilde{\theta}_{ToA}(i)$, is available and can be used to solve AoA localization with known orientation.

If an LOS condition is detected then two orientation estimates $\tilde{\theta}(i)$ and $\tilde{\theta}_{ToA}(i)$ are available. The orientation estimate $\tilde{\theta}(i)$ and $\tilde{\theta}_{ToA}(i)$ to be used can be chosen based on reducing a given error criterion. For example, the estimate that is chosen can be the estimate that minimizes the position error (Euclidean distance) between the ToA and AoA estimate. As an example, a performance error can be specified as $$J(i)=\frac{1}{K}\sum_{k=1}^{K}\sqrt{(x_{AoA}(i-k)-x_{ToA}(i-k))^2+(y_{AoA}(i-k)-y_{ToA}(i-k))^2}, \tag{33}$$

The orientation estimate $\tilde{\theta}(i)$ and $\tilde{\theta}_{ToA}(i)$ that minimizes J(i) can then be chosen.

In some examples additional means to improve the orientation estimate can be added based on physical constraints. The maximum angular velocity that the localization nod 102 can achieve provides a suitable physical constraint. For example, a robot may have a specified maximum angular velocity of 180°/s, and the parameter update rate (for position, orientation, clock offset) can be set to 10 Hz, then the absolute difference between two consecutive orientation estimates can be constrained to ≤18°. If this constraint is not fulfilled, then the orientation estimate or the underlying biased angle of arrival measurements are unreliable. In this case, the orientation estimate can be substituted, by extrapolation or by repetition of the previous orientation estimate or by any other suitable means.

Figure 15:
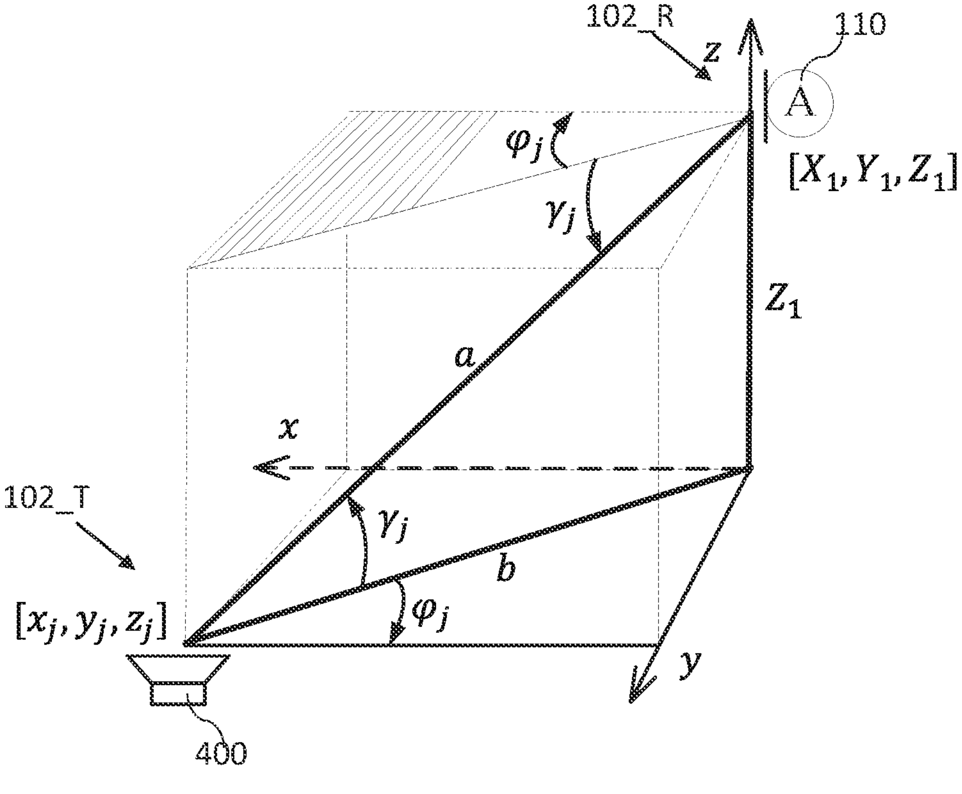
FIG. 15 shows an example spatial drawing for localization with one stationary node.

FIG. 15 shows an example spatial drawing for localization using just one acoustic signal. In this example the transmitting node 102_T comprises just one acoustic source 400 and the receiving node 102_R can comprise a microphone array 110. In this case the orientation of the microphone array 110 is known. This could be determined by the way the microphone array 110 is mounted to a wall or other object.

In this case localization of the acoustic source 400 is possible if both an azimuth angle is determined and an elevation angle for the direction of arrival of the acoustic signal from the acoustic source is determined. This two-dimensional direction of arrival can be derived from measurements of a two dimensional or three dimensional microphone array 110. In this architecture, the receiving node 102_R can provide measurements for the azimuth $\varphi_j$, the elevation $\gamma_j$, and the biased time of flight $$T_j'.$$

There are three unknowns, the clock offset $\tau_j$, and the position coordinates $[x_j, y_j]$ of the mobile node j, assuming a known and constant z-coordinate (here $z_j$=0). Three equations can be written, the first based on the Time of Flight, the second and third based on the direction of arrival:

$$\sin\gamma_j\cdot c(T_j'-\tau_j)=Z_1 \tag{34}$$

$$(x_j-X_1)=c(T_j'-\tau_j)\cos\gamma_j\cdot\cos(\varphi_j) \tag{35}$$

$$(y_j-Y_1)=c(T_j'-\tau_j)\cos\gamma_j\cdot\sin(\varphi_j) \tag{36}$$

where c is the speed of sound.

$$c(T_j'-\tau_j)$$

is represented by a in FIG. 15 and $$c(T_j'-\tau_j)\cos\gamma_j$$

is represented by b in FIG. 15.

Solving Equations (34)-(36) results in $$\tau_j=T_j'-\frac{Z_1}{c\cdot\sin\gamma_j} \tag{37}$$

$$x_j=X_1+c(T_j'-\tau_j)\cos\gamma_j\cdot\cos\varphi_j \tag{38}$$

$$y_j=Y_1+c(T_j'-\tau_j)\cos\gamma_j\cdot\sin\varphi_j \tag{39}$$

Figure 16:
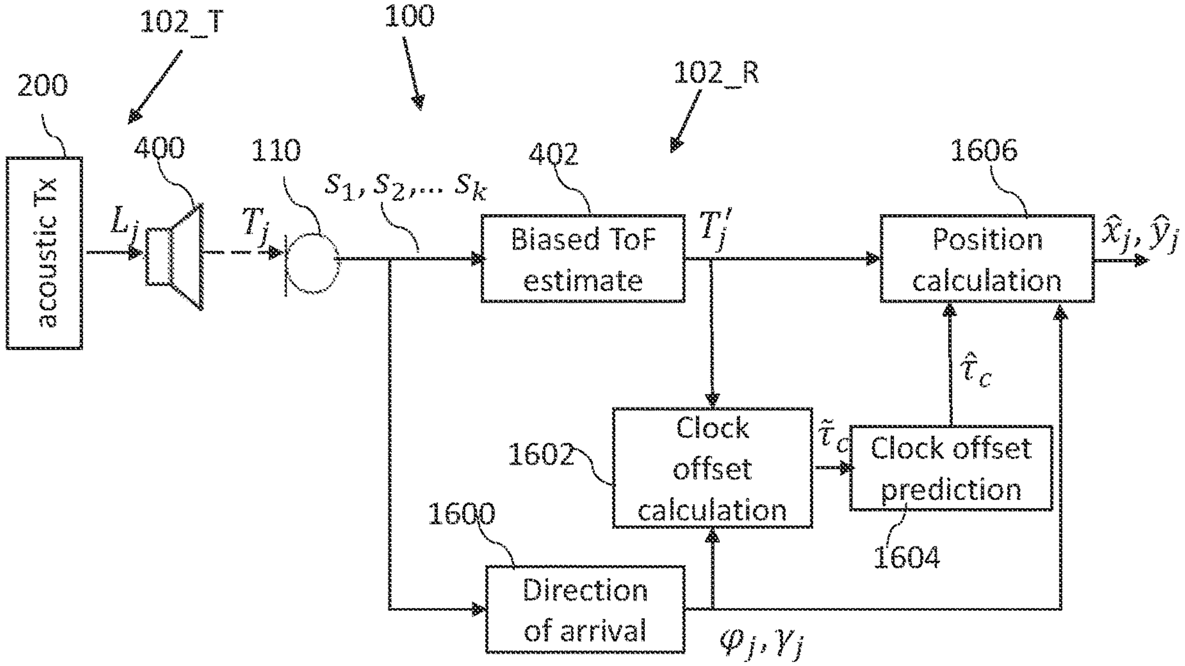
FIG. 16 shows an example acoustic localization system.

FIG. 16 shows an example acoustic localization system that uses equations (37) to (39) in combination with clock offset prediction for time synchronization.

In the example of FIG. 16 the system 100 comprises a transmitting localization node 102_T and a receiving localization node 102_R.

In the example of FIG. 16 the transmitting localization node 102_T comprises a single acoustic source 400 and is configured to transmit a single acoustic signal $L_j$. In this example the acoustic source 400 is provided by a single loudspeaker.

The transmitting localization node 102_T provides the acoustic signal $L_j$ that can be used to localize the transmitting localization node 102_T. The acoustic signal $L_j$ can be in the audible range and/or the ultrasonic range.

In the example system 100 of FIG. 16 the receiving localization node 102_R comprises a microphone or microphone array 110, a biased Time of Flight (ToF) estimate module 402, direction of arrival detection module 1600, a clock offset calculation module 1602, a clock offset prediction module 1604, and a position calculation module 1606. The receiving localization node 102_R can comprise other components or combinations of components in other examples.

The microphone array 110 detects the acoustic signal $L_j$ that has been transmitted from the acoustic source 400. The microphone array 110 provides the microphone signals $s_1$, $s_2$, . . . , $s_K$ as an output.

The receiving localization node 102_R is configured so that one or more of the microphone signals $s_1$, $s_2$, . . . , $s_K$ are provided to the biased ToF estimate module 402. The biased ToF estimate module 402 is configured to generate a first category of parameters for the detected acoustic signal $L_j$. In this example the first category of parameters is biased time of flight estimates. The biased ToF estimation module 402 provides biased time of flight estimate $$T_j'$$

as an output.

The receiving localization node 102_R is configured so that the microphone signals $s_1$, $s_2$, . . . , $s_K$ are also provided to the direction of arrival detection module 1600. The direction of arrival detection module 1600 is configured to use the microphone signals $s_1$, $s_2$, . . . , $s_K$ and the process described above to generate a second category of parameters. In this example the second category of parameters are direction of arrival estimates $\varphi_j$, $\gamma_j$.

The biased time of flight estimate $$T_j',$$

and the direction of arrival estimates $\varphi_j$, $\gamma_j$ are provided as inputs to the clock offset calculation module 1602. The clock offset calculation module 1602 can be configured to use any suitable process to generate the clock offset $\tilde{\tau}_c$. An example calculation for an instantaneous clock offset is provided in equation (37).

The clock offset $\tilde{\tau}_c$ is provided as an input to the clock offset prediction module 1604. The clock offset prediction module 1604 could perform a method as shown in FIGS. 11 to 13 or could perform any other suitable method. The clock offset prediction module 1604 can be configured to provide a predicted clock offset $\hat{\tau}_c$ as an output.

The predicted clock offset $\hat{\tau}_c$, the direction of arrival estimates $\varphi_j$, $\gamma_j$ and the biased time of flight estimate $$T_j'$$

are provided as inputs to the position calculation module 1606. The position calculation module 1606 is configured to process the received inputs and use the methods described above to provide a position estimates $\hat{x}_j$, $\hat{y}_j$ as an output. For example, the predicted clock offset $\hat{\tau}_c$ can be used in equations (38)-(39) to derive the position of the object.

The clock offset prediction module 1604 substantially improves the reliability of the position estimate $[\hat{x}_j, \hat{y}_j]$. Temporary errors in the estimated biased time-of-flight $$T_j'$$

have little effect on the final estimated clock offset $\hat{\tau}_c$, because changes in the parameters of the clock offset model occur at a significantly lower pace than changes in the other parameters, that is, the biased time-of-flight $$T_j',$$

and the direction of arrival angles $\varphi_j$ and $\gamma_j$.

For brevity, the mobile node index j has been left off in the instantaneous clock offset $\tilde{\tau}_c$ and the clock offset estimate $\hat{\tau}_c$ in FIG. 16. However, for each mobile node j, a separate set of parameters $$\left(T_j', \varphi_j, \gamma_j, \tilde{\tau}_c, \hat{\tau}_c, \hat{x}_j, \hat{y}_j\right)$$

is being established and tracked.

Generally, the more fixed nodes (102_T in forward architecture or 102_R in reverse architecture), the better the statistical localization performance. The statistical localization performance can be expressed as a Cumulative Distribution Function (CDF) of angle and orientation accuracy. Reducing the number of fixed localization nodes reduces the cost, but increases localization error.

Figure 17:
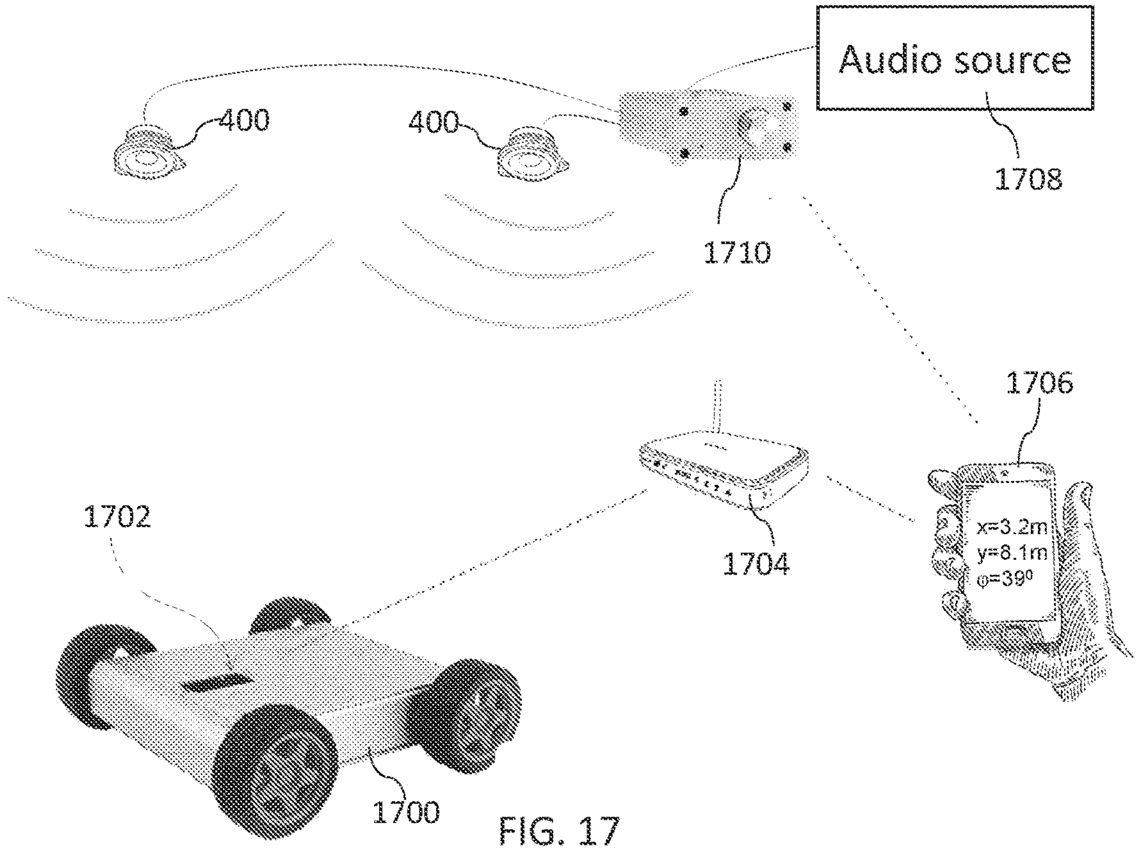
FIG. 17 shows an example application for an acoustic localization system.

FIG. 17 shows an example application for an acoustic localization system 100 such as the systems 100 shown in FIGS. 4 to 6 and FIGS. 8 to 10.

FIG. 17 shows a robot 1700. The robot 1700 is moveable. The robot 1700 comprises a tag 1702. The tag 1702 can enable localization or tracking of the robot 1700.The tag 1702 can comprise a localization node 102. The localization node 102 is not shown in FIG. 17. In this example the tag 1702 can comprise a receiving localization node 102_R.

The receiving localization node 102_R can a comprise microphone array 110 or any other suitable means for detecting acoustic signals. For example, the microphone array 110 can comprise a circular six-element MEMS microphone array with 1-cm diameter. Such a microphone array 110 can be suitable for detecting ultrasonic acoustic signals.

The tag 1702 can also comprise processing means such as a Single Board Computer (SBC). The processing means can be configured to process the detected acoustic signals using the processes described herein, or any other suitable processes, so as to enable the location of the robot 1700 to be estimated.

The tag 1702 can also comprise wireless communication means. The wireless communication means can enable WiFi communication or communications using any other suitable protocol. The communication means can enable the tag 1702 to communicate with other devices via a wireless communication router 1704. This can enable the tag 1702 to communicate with one or more user devices 1706 such as a mobile phone, computer or any other suitable device. The user device 1706 can enable the location estimates generated by the tag 1702 to be communicated to a user.

The example application shown in FIG. 17 also comprises multiple acoustic sources 400. In this example the acoustic sources 400 comprise loudspeakers or tweeters. In the example of FIG. 17 two acoustic sources 400 are shown. Other numbers of acoustic sources 400 could be used in other examples. The acoustic sources 400 can be part of one or more transmitting localization nodes 102_T.

The loudspeakers or tweeters that provide the acoustic sources 400 are configured to receive an audio signal from an audio amplifier 1710. The audio signal could be in the audible frequency spectrum and/or the lower end of the ultrasonic frequency spectrum.

The audio amplifier 1710 is configured to receive a source signal from an audio source 1708. The audio amplifier 1710 can be connected to the audio source 1708 by any suitable communication link. The communication link can be a wired connection or a wireless connection such as Bluetooth.

The source signals provided by the audio source 1708 can comprise signal sequences such as chirps or pseudo random noise sequences. The signal sequences can be different for different channels of the source signals so that the acoustic signals provided by the respective acoustic sources 400 can be distinguished from each other.

The audio source 1708 can be, for example, an audio player or an SBC that plays out the audio signal from its memory or accesses the audio signal from a server. In some examples, the source signals could be provided by other devices such as the user device 1706 or any other suitable device. In some examples the same device 1706 could be used to provide the source signals and also to enable the location estimate to be communicated to a user.

Other applications for the acoustic localization system 100 could be used in other examples. For instance, instead of a tag 1702 with a small form factor a larger device with a more powerful SBC. The tag 1702 could be attached to other devices, for example the tag could be in a wearable device that could be worn by a person to enable the location of a person to be tracked. This could be used for safety reasons, such as to keep a person away from moving objects in a factory in order to prevent injuries or for any other purpose.

In the example of FIG. 17 only a single tag 1702 is mounted on the robot 1700. In other examples multiple tags could mounted on the robot 1700 or any other suitable device. The tags mounted on the robot 1700 or other objects could comprise receiving localization nodes 102_R and/or transmitting localization nodes 102_T.

In the example of FIG. 17 WiFi signals can be transmitted from and to the tag 1702. These WiFi signals can be used to transmit information about the location estimates but cannot be used for synchronization of the tag 1702 and the acoustic signals via timestamps, because the WiFi signals do not provide the required synchronization accuracy.

Figure 18:
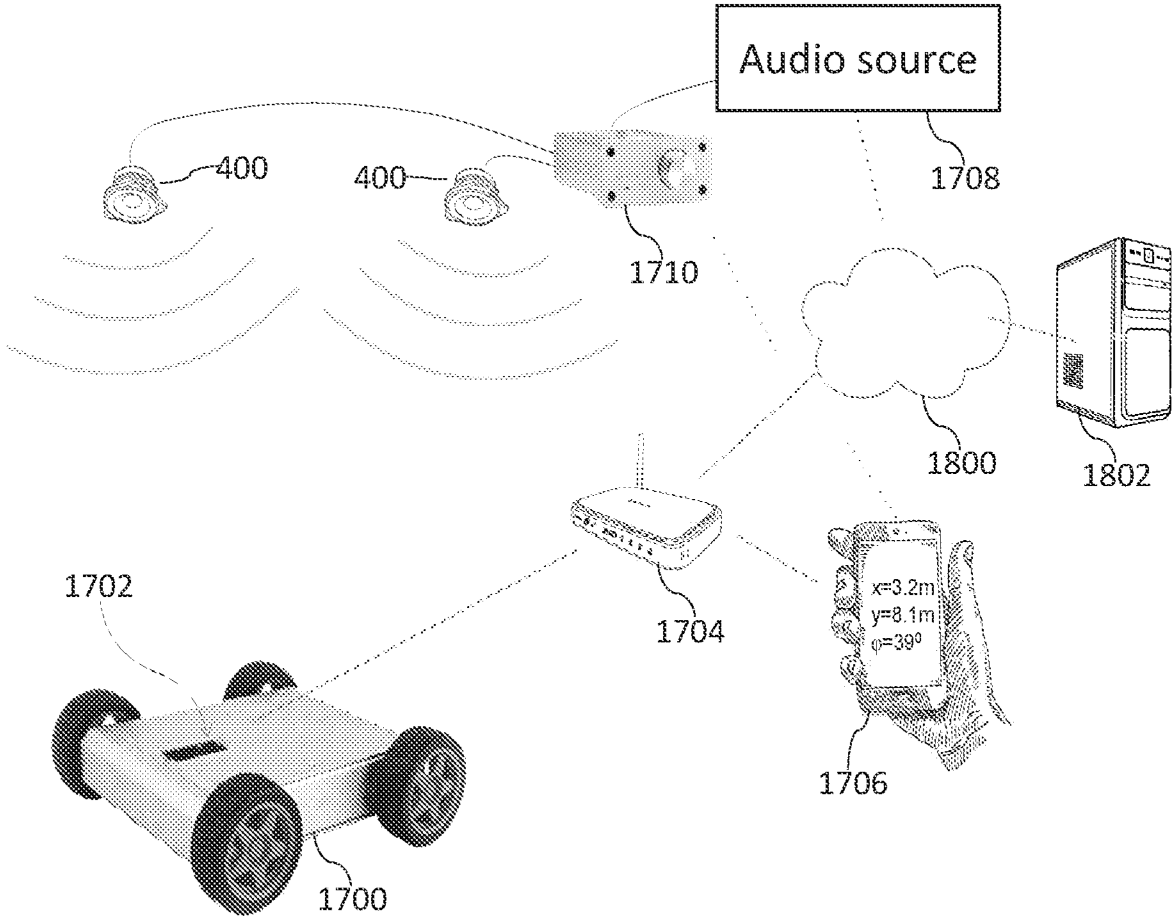
FIG. 18 shows an example application for an acoustic localization system.

FIG. 18 shows another example application for an acoustic localization system 100. The application is similar to that shown in FIG. 1807 however in FIG. 18 the application comprises a server 1802. The server 1802 can communicate with the other components via a communication network 1800. The communication network 1800 could be the internet or any other suitable network. The server 1802 can be configured to perform processing tasks such as the processing of the detected acoustic signals.

Figure 19:
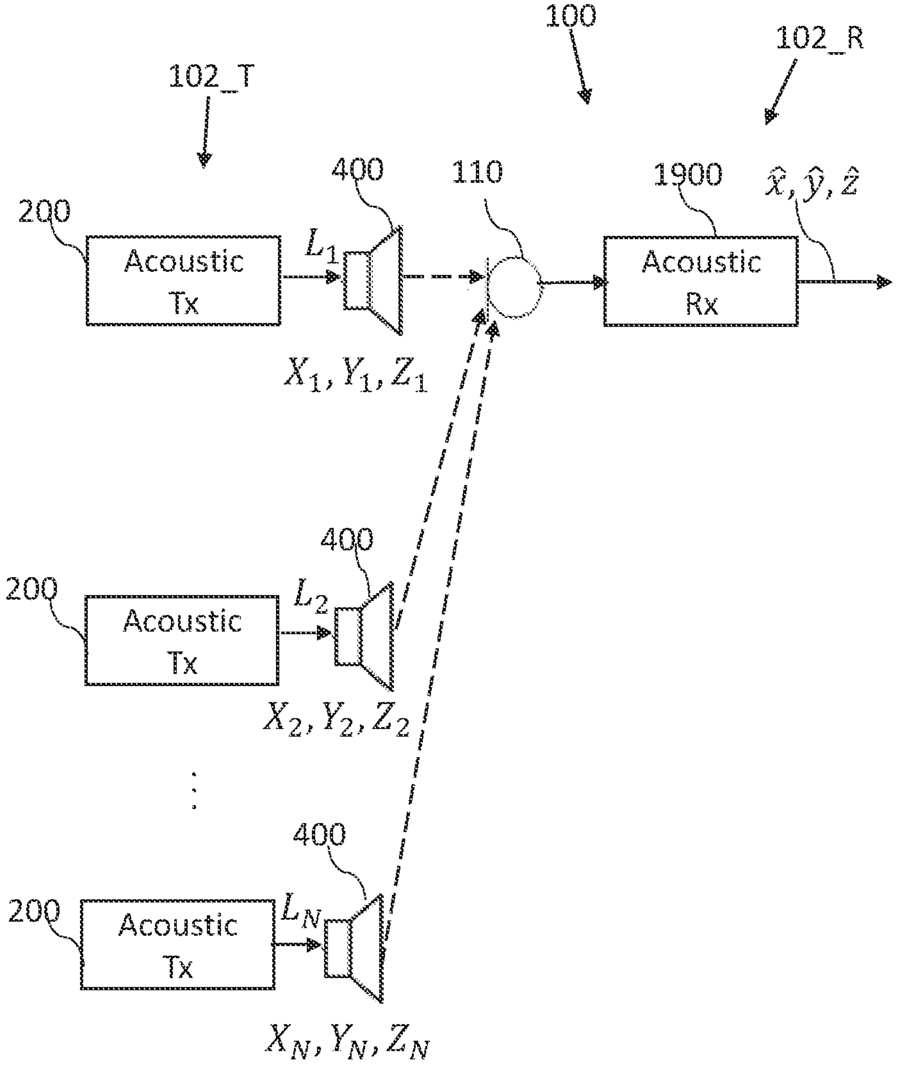
FIG. 19 shows an example architecture for acoustic localization.

FIG. 19 shows an example architecture that can be used in some of the systems 100 for acoustic localization. The respective systems 100 described herein can use forward architecture. FIG. 19 shows an example forward architecture with a single receiver localization node 102_R.

In this example the system 100 comprises multiple transmitter localization nodes 102_T. The positions of the stationary transmitter localization nodes 102_T are known.

The respective transmitter localization nodes 102_T comprise an acoustic transmitter 200 and an acoustic source 400. The acoustic transmitter 200 can comprise a signal generator and an amplifier and/or any other suitable components.

The receiver localization node 102_R is a mobile node. The location of the receiver localization node 102_R is unknown. Examples of the disclosure can be used to estimate the location of the receiver localization node 102_R.

The receiver localization node 102_R comprises a microphone or a microphone array 110 and an acoustic receiver 1900. The acoustic receiver 1900 can be configured to process the signals from the microphone or microphone array 110 to estimate the location of the receiver localization node 102_R.

In some examples the architecture of FIG. 19 could be implemented by having N loudspeakers, or other acoustic sources 400 mounted on a wall or other fixed object. The receiver localization node 102_R could be attached to a mobile object such as a robot or person or any other suitable object that is to be localized or tracked.

Figure 20:
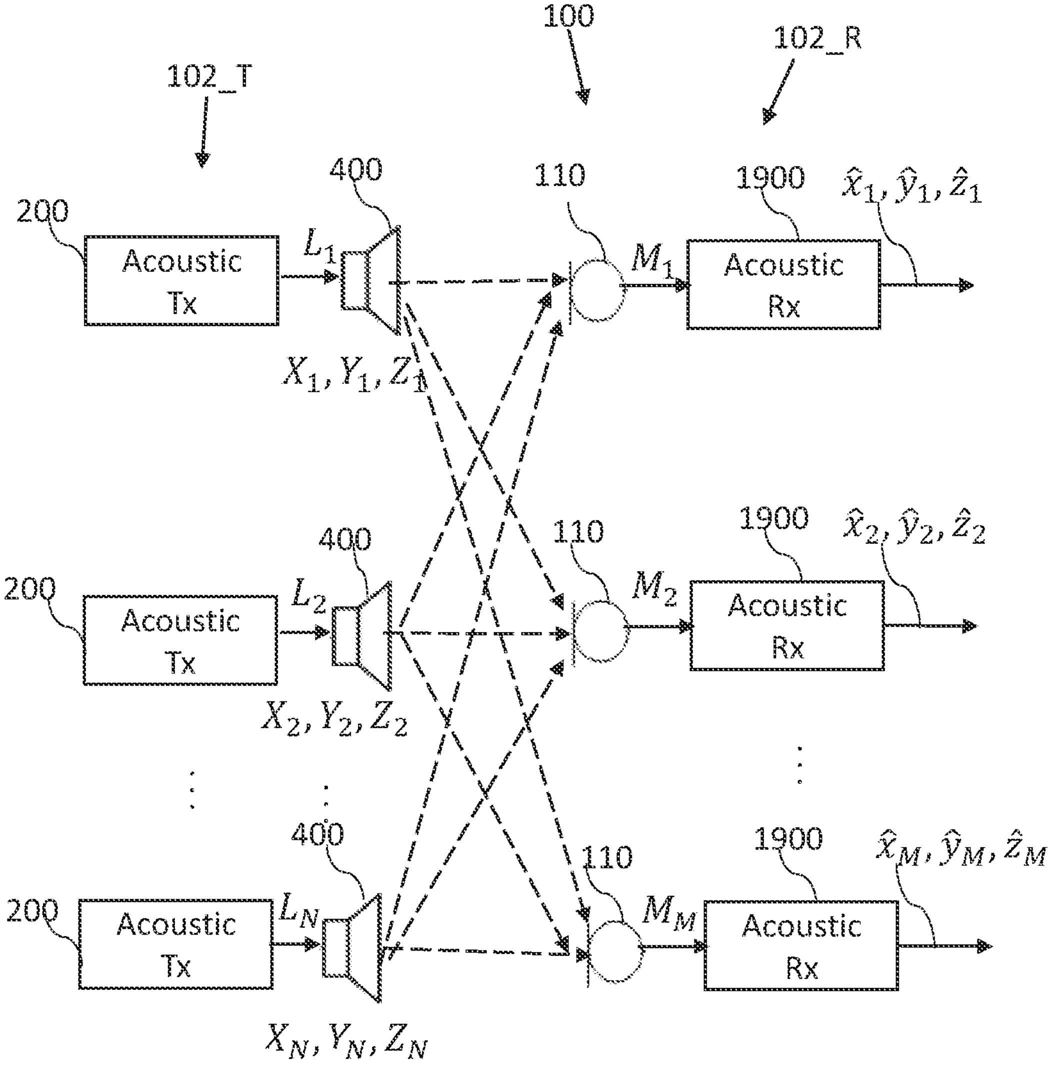
FIG. 20 shows an example architecture for acoustic localization.

FIG. 20 shows another example forward architecture. This example architecture comprises multiple transmitter localization nodes 102_T and multiple receiver localization nodes 102_R. The multiple transmitter localization nodes 102_T are as shown in FIG. 19.

Each of the respective multiple receiver localization nodes 102_R can be as shown in FIG. 19. Each of the multiple receiver localization nodes 102_R comprises an acoustic receiver 1900 and can be configured to estimate its own location.

Figure 21:
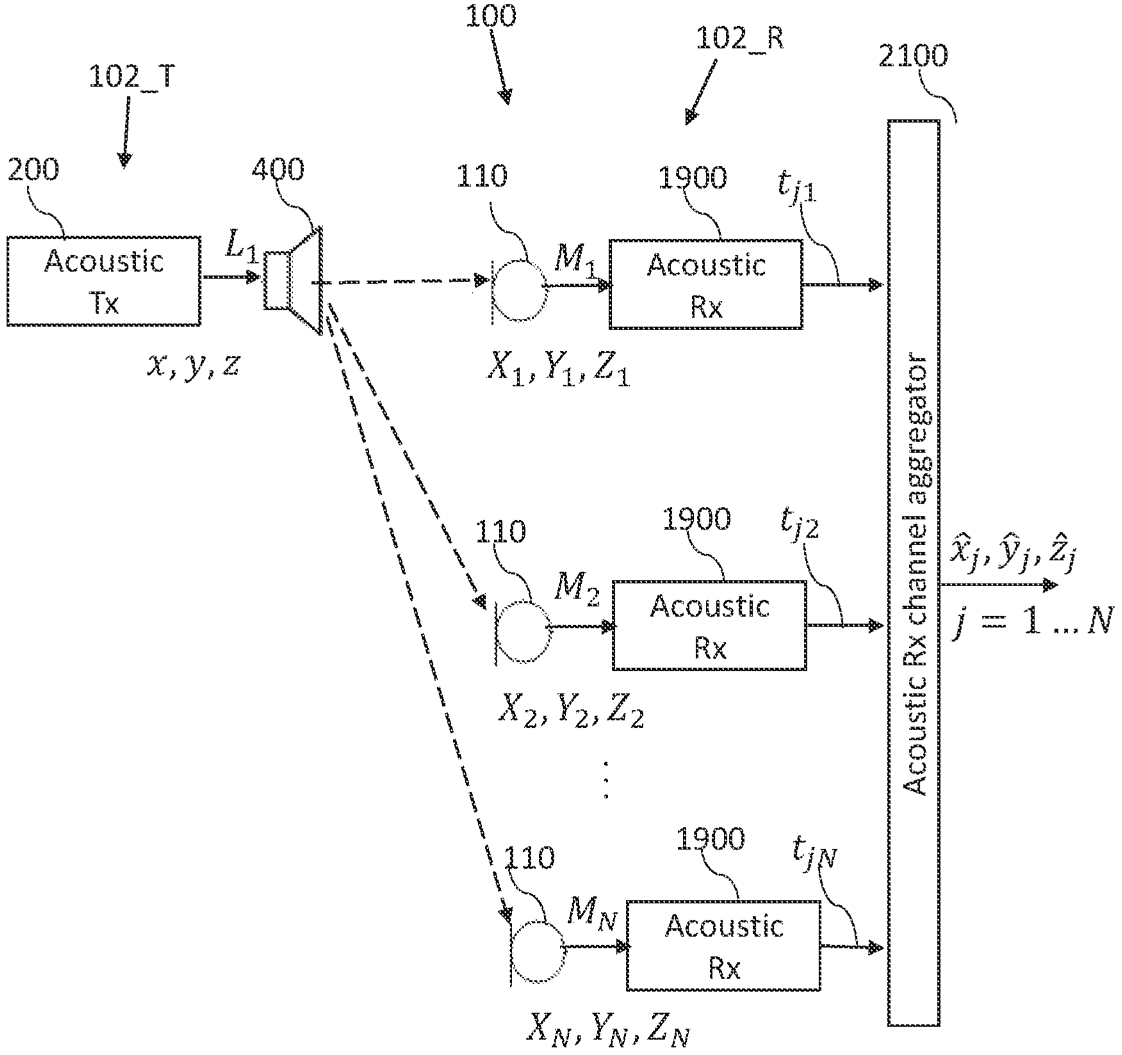
FIG. 21 shows an example architecture for acoustic localization.

FIG. 21 shows another example architecture for acoustic localization. FIG. 20 shows an example reverse architecture with a single transmitter localization node 102_T and multiple receiver localization nodes 102_R.

The single transmitter localization node 102_T has an unknown location. The multiple receiver localization nodes 102_R can be stationary nodes with known locations and can be configured to estimate the position of the transmitter localization node 102_T.

The transmitter localization nodes 102_T can be as shown in FIGS. 19 and 20. Each of the multiple receiver localization nodes 102_R can be as shown in FIGS. 19 and 20. The architecture of 2100 also comprises an acoustic receiver channel aggregator 2100 that aggregates the estimates from the respective receiver localization nodes 102_R.

Figure 22:
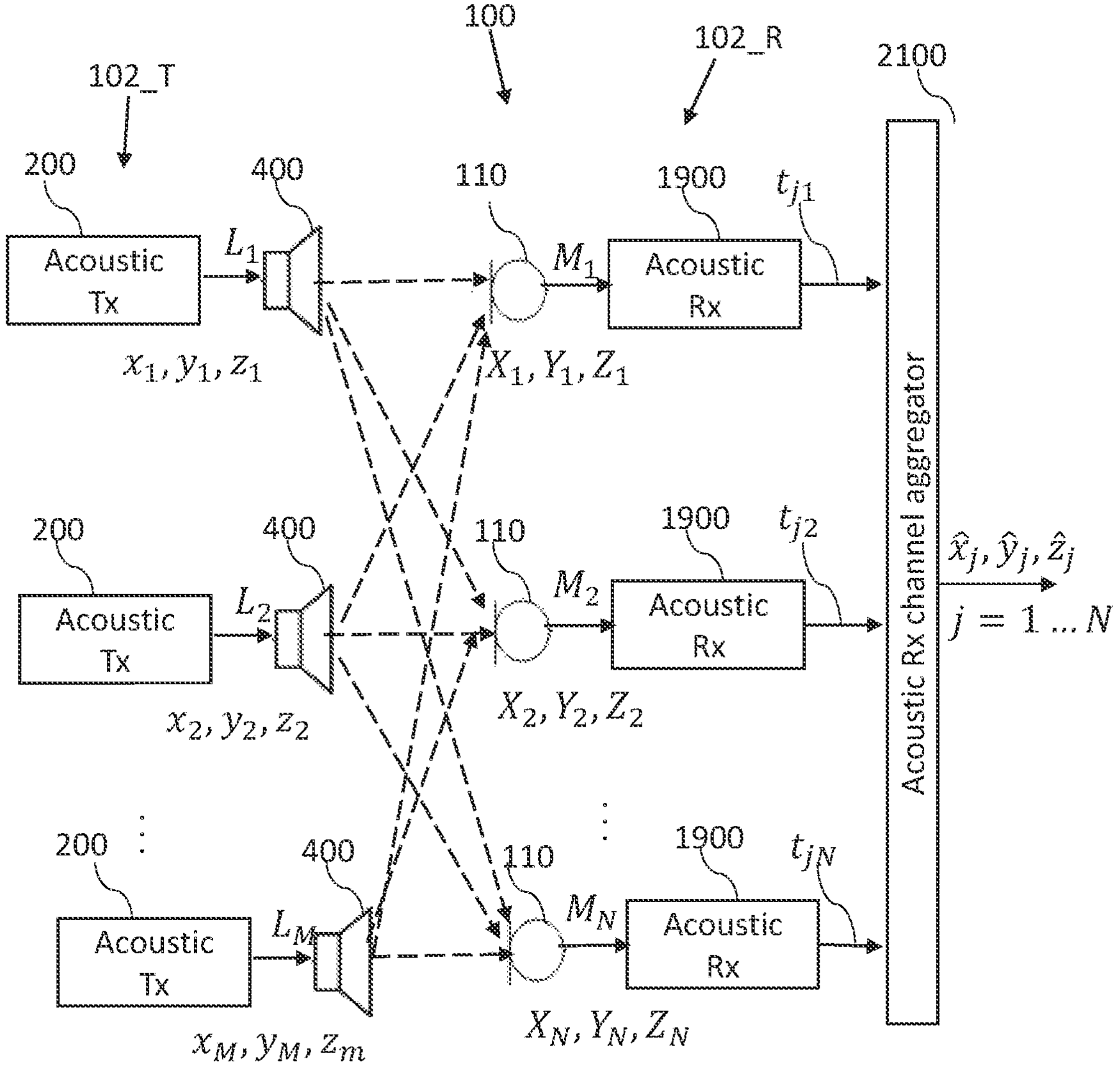
FIG. 22 shows an example architecture for acoustic localization.

FIG. 22 shows another example reverse architecture. This example architecture comprises multiple transmitter localization nodes 102_T and multiple receiver localization nodes 102_R. Each of the multiple transmitter localization nodes 102_T can be as shown in FIG. 21 and can have unknown positions. The architecture can be used to estimate the location of the respective transmitter localization nodes 102_T.

The respective multiple receiver localization nodes 102_R can be as shown in FIG. 21.

Figure 23:
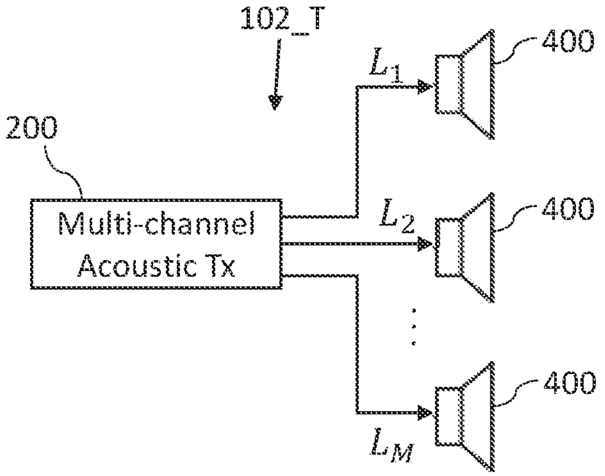
FIG. 23 shows an example localization node.

FIG. 23 shows an example transmitter localization node 102_T with multiple acoustic sources 400. In this example a single multi-channel acoustic transmitter can be configured to provide source signals to multiple acoustic sources 400. Such nodes can be used in systems 100 in examples of the disclosure.

Figure 24:
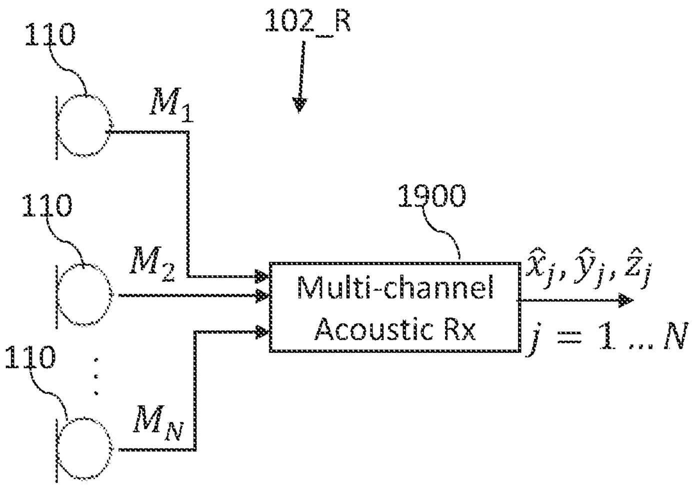
FIG. 24 shows an example localization node.

FIG. 24 shows an example receiver localization node 102_R with multiple microphones 110 or microphone arrays 110. In this example a single multi-channel acoustic receiver can be configured to process the signals from the multiple microphones 110 or microphone arrays 110 to estimate the location of the receiver localization node 102_R. Such nodes can be used in systems 100 in examples of the disclosure In the above described examples Time of Arrival (ToA) equations and Angle of Arrival (AoA) equations are used to estimate the locations of the nodes. In these equations the nodes are assumed to be single channel nodes. If a multi-channel node is used for a transmitting localization node 102_T and/or a receiving localization node 102_R then the equations are adjusted to take this into account.

In ToA equations an unknown coordinate position $[x_j(i), y_j(i), z_j(i)]$ of a mobile node j at time i can be estimated by $$(x_j(i)-X_k)^2+(y_j(i)-Y_k)^2+(z_j(i)-Z_k)^2=\left(c\left(T'_{kj}(i)-\tau_j(i)\right)\right)^2, \quad j=1\ldots M, k=1\ldots N \tag{40}$$

where $[X_k, Y_k, Z_k]$ is the position of the k-th stationary node, N is the total number of stationary nodes, M is the total number of mobile nodes, c is the speed of sound, and $$T'_{kj}(i)$$

is the biased travel time or Time of Flight (ToF) that is measured for the signal of the k-th stationary node to the j-th mobile node. The bias is due to the clock offset $\tau_j(i)$. In an asynchronous system in which the receiving node is not synchronized to the transmitting node, there is an unknown time offset $\tau_j(i)$ between the clocks of the respective nodes. Since the clock offset $\tau_j(i)$ may drift over time, it can be written as a function of the time, with a index i. In a synchronous localization system, there is no clock offset, that is, $\tau_j(i)=0$. However, in general, the Time of Flight can be denoted as $$T_{kj}(i) = T'_{kj}(i) - \tau_j(i),\ j = 1 \ldots M,\ k = 1 \ldots N \tag{41}$$

Both the forward and the reverse architecture are described by the same set of equations. Where the description refers to a system 100 using a forward architecture the solution for the reverse architecture can easily be derived thereof.

For two dimensional localization, it can be assumed that $z_j(i)$=const, that is, the mobile node is at a fixed, known height at any time. However, any stationary node can still be positioned at an arbitrary and different height than the mobile node. Therefore, the z-term is still retained in 2-D localization, but set $z_j(i)$=const.

For the AoA equations, the orientation of the mobile node plays a similar role as the clock offset in ToA. In ToA, the measured travel time $$T'_{kj}(i)$$

needs to be corrected with the clock offset $\tau_j(i)$, while in AoA, the measured angle of arrival $$\varphi'_{kj}(i)$$

needs to be corrected with the orientation $\theta_j(i)$ of the mobile node. The measured travel time is also referred to as the biased travel time and the measured angle of arrival is also referred to as the biased angle of arrival. The AoA equations follow from the tangent rule, $$\frac{y_j(i) - Y_k}{x_j(i) - X_k} = \tan(\varphi'_{kj}(i) - \theta_j(i)),\ j = 1 \ldots M,\ k = 1 \ldots N \tag{42}$$

From equation (42), the orientation $\theta_j(i)$ can be derived from any node k as $$\theta_j(i) = \varphi'_{kj}(i) - a\tan\left(\frac{y_j(i) - Y_k}{x_j(i) - X_k}\right),\ j = 1 \ldots M,\ k = 1 \ldots N \tag{43}$$

and the (unbiased) angle of arrival can be determined by $$\varphi_{kj}(i) = \varphi'_{kj}(i) - \theta_j(i),\ j = 1 \ldots M,\ k = 1 \ldots N \tag{44}$$

Figure 25:
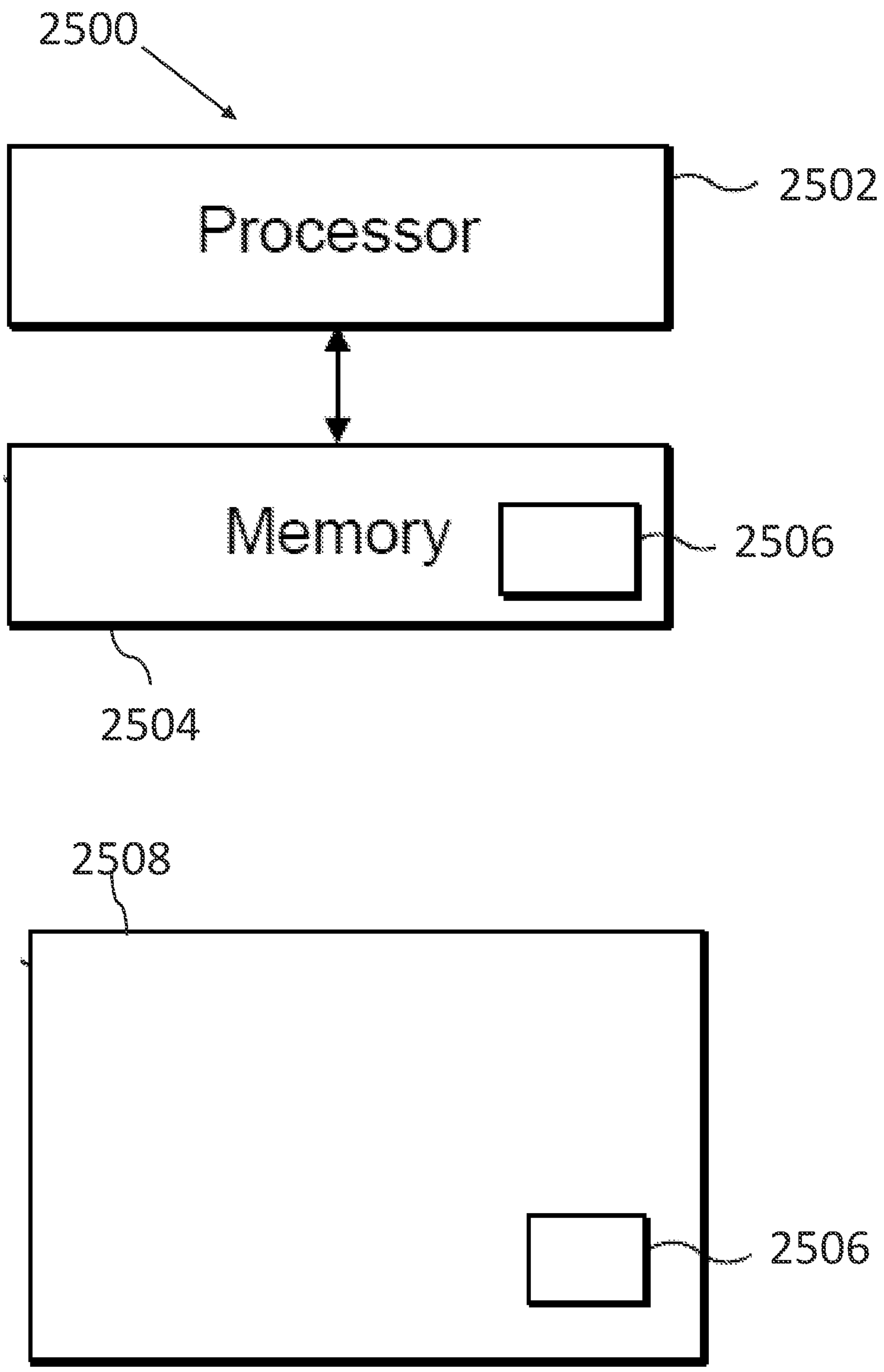
FIG. 25 shows an example apparatus.

FIG. 25 shows an example apparatus 2500 that can be used to implement examples of the disclosure. The apparatus 2500 could be provided within a retransmitting localization node 102_T, a receiving localization node 102_R or any other device that can be configured to localize a node.

The apparatus 2500 can provide a controller. Implementation of the apparatus 2500 may be as controller circuitry. The apparatus 2500 may be implemented in hardware alone, have certain aspects in software including firmware alone or can be a combination of hardware and software (including firmware).

As illustrated in FIG. 25 the apparatus 2500 can be implemented using instructions that enable hardware functionality, for example, by using executable instructions of a computer program 2506 in a general-purpose or special-purpose processor 2502 that may be stored on a computer readable storage medium (disk, memory etc.) to be executed by such a processor 2502.

The processor 2502 is configured to read from and write to the memory 2504. The processor 2502 may also comprise an output interface via which data and/or commands are output by the processor 2502 and an input interface via which data and/or commands are input to the processor 2502.

The memory 2504 stores a computer program 2506 comprising computer program instructions (computer program code) that controls the operation of the apparatus when loaded into the processor 2502. The computer program instructions, of the computer program 2506, provide the logic and routines that enables the apparatus to perform the methods illustrated in the Figs. The processor 2502 by reading the memory 2504 is able to load and execute the computer program 2506.

In some examples the apparatus 2500 comprises: at least one processor 2502; and at least one memory 2504 storing instructions that, when executed by the at least one processor 2502, cause the apparatus 2500 at least to perform:

detecting two or more acoustic signals originating from two or more acoustic sources;

generating a first category of parameters for the two or more detected acoustic signals;

generating a second category parameters for the two or more detected acoustic signals;

using, at least, the first category of parameters and the second category of parameters to generate a timing parameter for the two or more detected acoustic signals; and using, at least the timing parameter and the first category of parameters to determine an estimate of a location of an object associated with the two or more detected acoustic signals.

In some examples the apparatus 2500 comprises: at least one processor 2502; and at least one memory 2504 storing instructions that, when executed by the at least one processor 2502, cause the apparatus 2500 at least to perform:

detecting at least one acoustic signal originating from at least one acoustic source wherein the at least one acoustic signal is detected by multiple microphones;

generating a first category of parameters for the detected acoustic signal;

generating a second category parameters for the detected acoustic signal;

using, at least, the first category of parameters and the second category of parameters to generate a timing parameter for the detected acoustic signal; and using, at least the timing parameter and the first category of parameters to determine an estimate of a location of an object associated with the at least one detected acoustic signal.

In some examples the apparatus 2500 comprises: at least one processor 2502; and at least one memory 2504 storing instructions that, when executed by the at least one processor 2502, cause the apparatus 2500 at least to perform:

detecting three or more acoustic signals originating from three or more acoustic sources;

generating a first category of parameters for the three or more detected acoustic signals;

determining if one or more of the detected acoustic signals is an indirect path signal from a transmitter to a receiver;

estimating a location of an object associated with the detected acoustic signals using at least the first category of parameters and a timing parameter wherein an instantaneous timing parameter is used to estimate the location if it is not determined that one or more of the detected acoustic signals is an indirect path signal from a transmitter to a receiver and a predicted timing parameter is used to estimate the location if it is determined that one or more of the detected acoustic signals is an indirect path signal from a transmitter to a receiver.

In some examples the apparatus 2500 comprises: at least one processor 2502; and at least one memory 2504 storing instructions that, when executed by the at least one processor 2502, cause the apparatus 2500 at least to perform:

detecting at least one acoustic signal originating from at least one acoustic source wherein the acoustic signals are detected by multiple microphones to generate at least multiple microphone signals;

generating a first category of parameters for the three or more microphone signals;

determining if one or more of the microphone signals acoustic signals corresponds to an indirect path signal from a transmitter to a receiver;

The computer program 2506 may arrive at the apparatus 2500 via any suitable delivery mechanism 2508. The delivery mechanism 2508 may be, for example, a machine-readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid-state memory, an article of manufacture that comprises or tangibly embodies the computer program 2506. The delivery mechanism may be a signal configured to reliably transfer the computer program 2506. The apparatus may propagate or transmit the computer program 2506 as a computer data signal.

The computer program 2506 can comprise computer program instructions for causing an apparatus 2500 to perform at least the following or for performing at least the following:

detecting two or more acoustic signals originating from two or more acoustic sources;

generating a first category of parameters for the two or more detected acoustic signals;

generating a second category parameters for the two or more detected acoustic signals;

using, at least, the first category of parameters and the second category of parameters to generate a timing parameter for the two or more detected acoustic signals; and using, at least the timing parameter and the first category of parameters to determine an estimate of a location of an object associated with the two or more detected acoustic signals.

The computer program 2506 can comprise computer program instructions for causing an apparatus 2500 to perform at least the following or for performing at least the following:

detecting at least one acoustic signal originating from at least one acoustic source wherein the at least one acoustic signal is detected by multiple microphones;

generating a first category of parameters for the detected acoustic signal;

generating a second category parameters for the detected acoustic signal;

using, at least, the first category of parameters and the second category of parameters to generate a timing parameter for the detected acoustic signal; and using, at least the timing parameter and the first category of parameters to determine an estimate of a location of an object associated with the at least one detected acoustic signal.

The computer program 2506 can comprise computer program instructions for causing an apparatus 2500 to perform at least the following or for performing at least the following:

detecting three or more acoustic signals originating from three or more acoustic sources;

generating a first category of parameters for the three or more detected acoustic signals;

determining if one or more of the detected acoustic signals is an indirect path signal from a transmitter to a receiver;

estimating a location of an object associated with the detected acoustic signals using at least the first category of parameters and a timing parameter wherein an instantaneous timing parameter is used to estimate the location if it is not determined that one or more of the detected acoustic signals is an indirect path signal from a transmitter to a receiver and a predicted timing parameter is used to estimate the location if it is determined that one or more of the detected acoustic signals is an indirect path signal from a transmitter to a receiver.

The computer program 2506 can comprise computer program instructions for causing an apparatus 2500 to perform at least the following or for performing at least the following:

detecting at least one acoustic signal originating from at least one acoustic source wherein the acoustic signals are detected by multiple microphones to generate at least multiple microphone signals;

generating a first category of parameters for the three or more microphone signals;

determining if one or more of the microphone signals acoustic signals corresponds to an indirect path signal from a transmitter to a receiver;

The computer program instructions may be comprised in a computer program, a non-transitory computer readable medium, a computer program product, a machine-readable medium. In some but not necessarily all examples, the computer program instructions may be distributed over more than one computer program.

Although the memory 2504 is illustrated as a single component/circuitry it may be implemented as one or more separate components/circuitry some or all of which may be integrated/removable and/or may provide permanent/semi-permanent/dynamic/cached storage.

Although the processor 2502 is illustrated as a single component/circuitry it may be implemented as one or more separate components/circuitry some or all of which may be integrated/removable. The processor 2502 may be a single core or multi-core processor.

References to ‘computer-readable storage medium’, ‘computer program product’, ‘tangibly embodied computer program’ etc. or a ‘controller’, ‘computer’, ‘processor’ etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:

(a) hardware-only circuitry implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions and (c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The stages illustrated in the Figs. can represent steps in a method and/or sections of code in the computer program 2506. The illustration of a particular order to the blocks does not necessarily imply that there is a required or preferred order for the blocks and the order and arrangement of the block may be varied. Furthermore, it can be possible for some blocks to be omitted.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, the wording 'connect', 'couple' and 'communication' and their derivatives mean operationally connected/coupled/in communication. It should be appreciated that any number or combination of intervening components can exist (including no intervening components), i.e., so as to provide direct or indirect connection/coupling/communication. Any such intervening components can include hardware and/or software components.

As used herein, the term "determine/determining" (and grammatical variants thereof) can include, not least: calculating, computing, processing, deriving, measuring, investigating, identifying, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a', 'an' or 'the' is used in this document with an inclusive not an exclusive meaning. That is any reference to X comprising a/an/the Y indicates that X may comprise only one Y or may comprise more than one Y unless the context clearly indicates the contrary. If it is intended to use 'a', 'an' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The above description describes some examples of the present disclosure however those of ordinary skill in the art will be aware of possible alternative structures and method features which offer equivalent functionality to the specific examples of such structures and features described herein above and which for the sake of brevity and clarity have been omitted from the above description. Nonetheless, the above description should be read as implicitly including reference to such alternative structures and method features which provide equivalent functionality unless such alternative structures or method features are explicitly excluded in the above description of the examples of the present disclosure.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An apparatus for acoustic localization comprising:
at least one processor;
and at least one memory storing instructions that, when executed by the at least one processor, cause the apparatus at least to:
detect two or more acoustic signals originating from two or more acoustic sources;
generate a first category of parameters for the two or more acoustic signals, wherein the first category of parameters comprises two or more time of flight parameters;
generate a second category of parameters for the two or more acoustic signals;
generate, using a joint Time of Arrival/Angle of Arrival (ToA/AoA) estimate and based on the first category of parameters and the second category of parameters, a timing parameter for the two or more acoustic signals; and
use at least the timing parameter and the first category of parameters to determine an estimate of a location of an object associated with the two or more detected acoustic signals.

2. The apparatus as claimed in claim 1 wherein the second category of parameters comprises two or more angle of arrival parameters.

3. The apparatus as claimed in claim 1 wherein the at least one processor and memory are configured to cause the apparatus to use an iterative procedure to jointly resolve time of arrival equations and angle of arrival equations to generate the timing parameter.

4. The apparatus as claimed in claim 1 wherein the at least one processor and memory are configured to cause the apparatus to use, at least, the first category of parameters and the second category of parameters to generate an instantaneous timing parameter and using the instantaneous timing parameter to generate a predicted timing parameter.

5. The apparatus as claimed in claim 1 wherein the timing parameter comprises a clock offset.

6. The apparatus as claimed in claim 1 wherein the at least one processor and memory are configured to cause the apparatus to use, at least, the first category of parameters and the second category of parameters to generate an orientation parameter for the object associated with the two or more acoustic signals.

7. The apparatus as claimed in claim 6 wherein the at least one processor and memory are configured to cause the apparatus to use, at least, the orientation parameter and the estimate of the location of the object to estimate an orientation of the object.

8. The apparatus as claimed in claim 1 wherein the at least one processor and memory are configured to cause the apparatus to generate one or more additional estimates of the location of the object associated with the two or more acoustic signals.

9. The apparatus as claimed in claim 8 wherein an additional estimate of the one or more additional estimates of the location of the object associated with the two or more acoustic signals is generated by using an orientation parameter and the second category of parameters.

10. The apparatus as claimed in claim 8 wherein an additional estimate of the one or more additional estimates of the location of the object associated with the two or more acoustic signals is generated by using first category of parameters and the second category of parameters.

11. The apparatus as claimed in claim 8 wherein the at least one processor and memory are configured to cause the apparatus to process the estimate of the location of the object and one or more additional estimates of the location to generate an adjusted estimate of the location of the object.

12. The apparatus as claimed in claim 11 wherein the adjusted estimate of the location of the object is generated by using one or more fusion estimation algorithms to combine parameters from two or more respective estimates of the location.

13. The apparatus as claimed in claim 1 wherein the object that is to be localized comprises two or more microphones for detecting acoustic signals.

14. The apparatus as claimed in claim 1 wherein the object that is to be localized comprises one or more loudspeakers for transmitting acoustic signals.

15. The apparatus as claimed in claim 1 wherein the object to be localized is in a same environment as one or more acoustic sources and two or more microphones for detecting acoustic signals.

16. An apparatus for acoustic localization comprising:
at least one processor;
and at least one memory storing instructions that, when executed by the at least one processor, cause the apparatus at least to:
detect at least one acoustic signal originating from at least one acoustic source wherein the at least one acoustic signal is detected by multiple microphones;
generate a first category of parameters for the at least one acoustic signal, wherein the first category of parameters comprises two or more time of flight parameters;
generate a second category of parameters for the at least one acoustic signal;
generate, using a joint Time of Arrival/Angle of Arrival (ToA/AoA) estimate and based on the first category of parameters and the second category of parameters, a timing parameter for the at least one acoustic signal; and
use at least the timing parameter and the first category of parameters to determine an estimate of a location of an object associated with the at least one detected acoustic signal.

17. The apparatus as claimed in claim 16 wherein the apparatus is comprised within a reverse architecture system.

18. An apparatus for acoustic localization comprising:
at least one processor;
and at least one memory storing instructions that, when executed by the at least one processor, cause the apparatus at least to:
detect three or more acoustic signals originating from three or more acoustic sources;

generate a first category of parameters for the three or more acoustic signals, wherein the first category of parameters comprises two or more time of flight parameters;

determine if one or more of the three or more acoustic signals is an indirect path signal from a transmitter to a receiver;

estimate a location of an object associated with the three or more acoustic signals using at least the first category of parameters and a timing parameter, wherein (i) the timing parameter comprises an instantaneous timing parameter responsive to determining that one or more of the three or more acoustic signals comprise one or more line-of-sight (LOS) signals from a transmitter to a receiver, (ii) the timing parameter comprises a predicted timing parameter responsive to determining that one or more of the three or more acoustic signals comprise one or more non-line-of-sight (NLOS) signals from a transmitter to a receiver, and (iii) the predicted timing parameter is predicted based, at least in part, on one or more previous estimates of the instantaneous timing parameter.

19. The apparatus as claimed in claim 18 wherein the first category of parameters comprises three or more time of flight parameters.

* * * * *